United States Patent
De Lega et al.

(10) Patent No.: US 7,889,355 B2
(45) Date of Patent: Feb. 15, 2011

(54) INTERFEROMETRY FOR LATERAL METROLOGY

(75) Inventors: Xavier Colonna De Lega, Middletown, CT (US); Robert Stoner, Duxbury, MA (US); Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 540 days.

(21) Appl. No.: 11/757,720

(22) Filed: Jun. 4, 2007

(65) Prior Publication Data

US 2008/0180685 A1    Jul. 31, 2008

Related U.S. Application Data

(60) Provisional application No. 60/887,448, filed on Jan. 31, 2007.

(51) Int. Cl.
 *G01B 9/02* (2006.01)
(52) U.S. Cl. .................................................... 356/511
(58) Field of Classification Search ............ 356/497, 356/512, 516
 See application file for complete search history.

(56) References Cited

U.S. PATENT DOCUMENTS

| | | | |
|---|---|---|---|
| 2,612,074 A | 9/1952 | Mirau | |
| 4,188,122 A | 2/1980 | Massie et al. | |
| 4,199,219 A | 4/1980 | Suzuki et al. | |
| 4,340,306 A | 7/1982 | Balasubramanian | |
| 4,355,903 A | 10/1982 | Sandercock | |
| 4,523,846 A | 6/1985 | Breckinridge et al. | |
| 4,576,479 A | 3/1986 | Downs | |
| 4,583,858 A | 4/1986 | Lebling et al. | |
| 4,618,262 A | 10/1986 | Maydan et al. | |
| 4,639,139 A | 1/1987 | Wyant et al. | |
| 4,660,980 A | 4/1987 | Takabayashi et al. | |
| 4,710,642 A | 12/1987 | McNeil | |
| 4,806,018 A | 2/1989 | Falk | |
| 4,818,110 A | 4/1989 | Davidson | |
| 4,869,593 A | 9/1989 | Biegen | |
| 4,923,301 A | 5/1990 | White | |
| 4,948,253 A | 8/1990 | Biegen | |

(Continued)

FOREIGN PATENT DOCUMENTS

DE    4108944    9/1992

(Continued)

OTHER PUBLICATIONS

Biegen, "Determination of the Phase Change on Reflection from Two-beam Interference," Optics Letters, 19:21:1690-1692, Nov. 1, 1994.

(Continued)

*Primary Examiner*—Hwa S. A Lee
(74) *Attorney, Agent, or Firm*—Fish & Richardson P.C.

(57) ABSTRACT

A method is disclosed which includes: using a scanning interferometry system, generating a sequence of phase-shifted interferometry images at different scan positions of an object comprising a buried surface, identifying a scan position corresponding to a position of best focus for the buried surface based on the sequence of phase-shifted interferometry images of the object, and generating a final image based on the phase-shifted interferometry images and the scan position, where the interferometric fringes in the final image are reduced relative to the interferometric fringes in the phase-shifted interferometry images.

35 Claims, 13 Drawing Sheets

U.S. PATENT DOCUMENTS

| | | | |
|---|---|---|---|
| 4,964,726 A | 10/1990 | Kleinknecht et al. | |
| 4,999,014 A | 3/1991 | Gold et al. | |
| 5,042,949 A | 8/1991 | Greenberg et al. | |
| 5,042,951 A | 8/1991 | Gold et al. | |
| 5,073,018 A | 12/1991 | Kind et al. | |
| 5,112,129 A | 5/1992 | Davidson et al. | |
| 5,129,724 A | 7/1992 | Brophy et al. | |
| 5,133,601 A | 7/1992 | Cohen et al. | |
| 5,135,307 A | 8/1992 | de Groot et al. | |
| 5,153,669 A | 10/1992 | DeGroot | |
| 5,164,790 A | 11/1992 | McNeil et al. | |
| 5,166,751 A | 11/1992 | Massig | |
| 5,173,746 A | 12/1992 | Brophy | |
| 5,194,918 A | 3/1993 | Kino et al. | |
| 5,241,369 A | 8/1993 | McNeil et al. | |
| 5,301,010 A | 4/1994 | Jones et al. | |
| 5,355,221 A * | 10/1994 | Cohen et al. | 356/497 |
| 5,384,717 A | 1/1995 | Ebenstein | |
| 5,386,119 A | 1/1995 | Ledger | |
| 5,390,023 A | 2/1995 | Biegen | |
| 5,398,113 A | 3/1995 | de Groot et al. | |
| 5,402,234 A | 3/1995 | Deck | |
| 5,438,413 A | 8/1995 | Mazor et al. | |
| 5,459,564 A | 10/1995 | Chivers | |
| 5,471,303 A | 11/1995 | Ai et al. | |
| 5,481,811 A | 1/1996 | Smith | |
| 5,483,064 A | 1/1996 | Frey et al. | |
| 5,539,517 A | 7/1996 | Cabib et al. | |
| 5,543,841 A | 8/1996 | Kanamori | |
| 5,555,471 A | 9/1996 | Xu et al. | |
| 5,587,792 A | 12/1996 | Nishizawa et al. | |
| 5,589,938 A | 12/1996 | Deck | |
| 5,602,643 A | 2/1997 | Barrett | |
| 5,633,714 A | 5/1997 | Nyyssonen | |
| 5,640,270 A | 6/1997 | Aziz et al. | |
| 5,703,692 A | 12/1997 | McNeil et al. | |
| 5,757,502 A | 5/1998 | Weling | |
| 5,774,224 A | 6/1998 | Kerstens | |
| 5,777,740 A | 7/1998 | Lacey et al. | |
| 5,777,742 A | 7/1998 | Marron | |
| 5,784,164 A | 7/1998 | Deck et al. | |
| 5,856,871 A | 1/1999 | Cabib et al. | |
| 5,867,276 A | 2/1999 | McNeil et al. | |
| 5,880,838 A | 3/1999 | Marx et al. | |
| 5,900,633 A | 5/1999 | Solomon et al. | |
| 5,912,741 A | 6/1999 | Carter et al. | |
| 5,923,423 A | 7/1999 | Sawarti et al. | |
| 5,943,134 A | 8/1999 | Yamaguchi et al. | |
| 5,953,124 A | 9/1999 | Deck | |
| 5,956,141 A | 9/1999 | Hayashi | |
| 5,959,735 A | 9/1999 | Maris et al. | |
| 5,963,329 A | 10/1999 | Conrad et al. | |
| 6,028,670 A | 2/2000 | Deck | |
| 6,108,087 A | 8/2000 | Nikoonahad et al. | |
| 6,134,003 A * | 10/2000 | Tearney et al. | 356/479 |
| 6,160,621 A | 12/2000 | Perry et al. | |
| 6,172,452 B1 | 1/2001 | Itaya et al. | |
| 6,242,739 B1 | 6/2001 | Cherkassky | |
| 6,249,351 B1 | 6/2001 | de Groot | |
| H1972 H | 7/2001 | Inoue | |
| 6,259,521 B1 | 7/2001 | Miller et al. | |
| 6,275,297 B1 | 8/2001 | Zalicki | |
| 6,377,349 B1 | 4/2002 | Fercher | |
| 6,381,009 B1 | 4/2002 | McGahan | |
| 6,392,749 B1 | 5/2002 | Meeks et al. | |
| 6,417,109 B1 | 7/2002 | Jordan et al. | |
| 6,429,943 B1 | 8/2002 | Opsal et al. | |
| 6,449,048 B1 | 9/2002 | Olszak | |
| 6,449,066 B1 | 9/2002 | Arns et al. | |
| 6,483,580 B1 | 11/2002 | Xu et al. | |
| 6,500,591 B1 | 12/2002 | Adams | |
| 6,507,405 B1 | 1/2003 | Grek et al. | |
| 6,525,825 B2 | 2/2003 | de Groot | |
| 6,545,761 B1 | 4/2003 | Aziz et al. | |
| 6,545,763 B1 | 4/2003 | Kim et al. | |
| 6,590,656 B2 | 7/2003 | Xu et al. | |
| 6,597,460 B2 | 7/2003 | Groot et al. | |
| 6,611,330 B2 | 8/2003 | Lee et al. | |
| 6,624,894 B2 | 9/2003 | Olszak et al. | |
| 6,633,389 B1 | 10/2003 | Poris et al. | |
| 6,633,831 B2 | 10/2003 | Nikoonahad et al. | |
| 6,636,322 B1 | 10/2003 | Terashita | |
| 6,687,008 B1 | 2/2004 | Peale et al. | |
| 6,694,284 B1 | 2/2004 | Nikoonahad et al. | |
| 6,714,307 B2 | 3/2004 | De Groot et al. | |
| 6,721,094 B1 | 4/2004 | Sinclair et al. | |
| 6,741,357 B2 | 5/2004 | Wang et al. | |
| 6,741,360 B2 | 5/2004 | D'Agraives et al. | |
| 6,775,006 B2 | 8/2004 | De Groot et al. | |
| 6,775,009 B2 | 8/2004 | Hill | |
| 6,798,511 B1 | 9/2004 | Zhan et al. | |
| 6,822,745 B2 | 11/2004 | De Groot et al. | |
| 6,856,384 B1 | 2/2005 | Rovira | |
| 6,888,638 B1 | 5/2005 | Hill | |
| 6,891,627 B1 | 5/2005 | Levy et al. | |
| 6,909,509 B2 | 6/2005 | De Groot | |
| 6,925,860 B1 | 8/2005 | Poris et al. | |
| 6,940,604 B2 | 9/2005 | Jung et al. | |
| 6,956,658 B2 | 10/2005 | Meeks et al. | |
| 6,956,660 B2 | 10/2005 | Meeks et al. | |
| 6,985,232 B2 | 1/2006 | Sezginer | |
| 6,989,905 B2 | 1/2006 | De Groot | |
| 6,999,180 B1 | 2/2006 | Janik et al. | |
| 7,012,700 B2 | 3/2006 | de Groot et al. | |
| 7,018,271 B2 | 3/2006 | Wiswesser et al. | |
| 7,038,850 B2 | 5/2006 | Chang et al. | |
| 7,046,371 B2 | 5/2006 | De Lega et al. | |
| 7,057,741 B1 | 6/2006 | Mueller et al. | |
| 7,061,623 B2 | 6/2006 | Davidson | |
| 7,061,625 B1 | 6/2006 | Hwang et al. | |
| 7,068,376 B2 | 6/2006 | de Groot | |
| 7,088,451 B2 | 8/2006 | Sezginer | |
| 7,095,507 B1 | 8/2006 | Hwang et al. | |
| 7,102,761 B2 | 9/2006 | De Lega et al. | |
| 7,106,454 B2 | 9/2006 | De Groot et al. | |
| 7,119,909 B2 | 10/2006 | Unruh et al. | |
| 7,139,081 B2 * | 11/2006 | De Groot | 356/503 |
| 7,139,083 B2 | 11/2006 | Fielden et al. | |
| 7,142,311 B2 | 11/2006 | De Lega | |
| 7,173,715 B2 | 2/2007 | Mueller et al. | |
| 7,177,030 B2 | 2/2007 | Leizerson | |
| 7,239,398 B2 | 7/2007 | De Groot et al. | |
| 7,271,918 B2 | 9/2007 | De Groot et al. | |
| 7,283,248 B2 | 10/2007 | Hill | |
| 7,289,225 B2 | 10/2007 | De Groot | |
| 7,298,494 B2 | 11/2007 | De Groot | |
| 7,304,747 B2 | 12/2007 | De Lega | |
| 7,315,382 B2 | 1/2008 | De Groot | |
| 7,324,210 B2 | 1/2008 | De Groot et al. | |
| 7,324,214 B2 | 1/2008 | De Groot et al. | |
| 2002/0015146 A1 | 2/2002 | Meeks et al. | |
| 2002/0135775 A1 | 9/2002 | de Groot et al. | |
| 2002/0148955 A1 | 10/2002 | Hill | |
| 2002/0196450 A1 | 12/2002 | Olszak et al. | |
| 2003/0011784 A1 | 1/2003 | de Groot et al. | |
| 2003/0048458 A1 | 3/2003 | Mieher et al. | |
| 2003/0075721 A1 | 4/2003 | Li | |
| 2003/0112444 A1 | 6/2003 | Yang et al. | |
| 2003/0137671 A1 | 7/2003 | De Groot et al. | |
| 2003/0197871 A1 | 10/2003 | Groot | |
| 2004/0027576 A1 | 2/2004 | De Groot et al. | |
| 2004/0075843 A1 | 4/2004 | Marron et al. | |
| 2004/0085544 A1 | 5/2004 | de Groot et al. | |
| 2004/0185582 A1 | 9/2004 | Kueny | |

| | | | |
|---|---|---|---|
| 2004/0189999 A1 | 9/2004 | de Groot et al. |
| 2004/0233442 A1 | 11/2004 | Mieher et al. |
| 2004/0233444 A1 | 11/2004 | Mieher et al. |
| 2004/0246493 A1 | 12/2004 | Kim et al. |
| 2005/0024773 A1 | 2/2005 | Lille |
| 2005/0057757 A1 | 3/2005 | de Lega et al. |
| 2005/0068540 A1 | 3/2005 | de Groot et al. |
| 2005/0073692 A1 | 4/2005 | de Groot et al. |
| 2005/0078318 A1 | 4/2005 | de Groot |
| 2005/0078319 A1 | 4/2005 | de Groot |
| 2005/0088663 A1 | 4/2005 | de Groot et al. |
| 2005/0146727 A1 | 7/2005 | Hill |
| 2005/0179911 A1 | 8/2005 | Boomgarden et al. |
| 2005/0225769 A1 | 10/2005 | Bankhead et al. |
| 2005/0237534 A1 | 10/2005 | Deck |
| 2005/0237537 A1 | 10/2005 | Leizerson et al. |
| 2006/0012582 A1 | 1/2006 | de Lega |
| 2006/0119841 A1 | 6/2006 | Saunders et al. |
| 2006/0158657 A1 | 7/2006 | de Lega et al. |
| 2006/0158658 A1 | 7/2006 | de Lega et al. |
| 2006/0158659 A1 | 7/2006 | de Lega et al. |
| 2006/0170932 A1 | 8/2006 | Hayashi et al. |
| 2006/0187465 A1 | 8/2006 | De Groot |
| 2006/0262321 A1 | 11/2006 | de Groot |
| 2007/0008551 A1 | 1/2007 | Tang |
| 2007/0046953 A1 | 3/2007 | de Groot et al. |
| 2007/0081167 A1 | 4/2007 | de Groot |
| 2007/0086013 A1 | 4/2007 | De Lega et al. |
| 2007/0091317 A1 | 4/2007 | Freischlad et al. |
| 2007/0091318 A1 | 4/2007 | Freiscglad et al. |
| 2007/0097380 A1 | 5/2007 | de Groot et al. |
| 2007/0127036 A1 | 6/2007 | Liao et al. |
| 2007/0139656 A1 | 6/2007 | Wan |
| 2007/0247637 A1 | 10/2007 | De Groot |
| 2008/0018901 A1 | 1/2008 | de Groot |
| 2008/0088849 A1 | 4/2008 | de Lega et al. |

FOREIGN PATENT DOCUMENTS

| | | |
|---|---|---|
| DE | 4309056 | 9/1994 |
| EP | 0 397 388 A2 | 11/1990 |
| EP | 0 549 166 A2 | 6/1993 |
| EP | 0 617 255 A1 | 9/1994 |
| EP | 0 929 094 A2 | 7/1999 |
| GB | 2385417 | 8/2003 |
| JP | 08-327327 | 12/1996 |
| JP | 09-218016 | 8/1997 |
| JP | 2000121317 | 4/2000 |
| JP | 2000-180124 | 6/2000 |
| JP | 2001/272603 | 10/2001 |
| JP | 2001-141652 | 5/2009 |
| KR | 20000061037 | 10/2000 |
| WO | WO 93/24805 | 12/1993 |
| WO | WO 95/09343 | 4/1995 |
| WO | WO 97/44633 | 11/1997 |
| WO | WO 02/82008 | 10/2002 |
| WO | WO 03/036229 | 5/2003 |
| WO | WO 03/062802 | 7/2003 |
| WO | WO 2004/023071 | 3/2004 |
| WO | WO 2005/029192 | 3/2005 |

OTHER PUBLICATIONS

Bishop, et al., "Grating line shape characterization using scatterometry," SPIE 1545, 64-73 (1991).

Chim, S. S. C. and Kino, G. S., "Three-Dimensional Image Realization in Interference Microscopy", Applied Optics, May 10, 1992, vol. 31, No. 14.

Creath, "Step height measurement using two-wavelength phase-shifting interferometry", Applied Optics, vol. 26, No. 14, pp. 2810-2816 (Jul. 15, 1987).

Danielson et al., "Absolute Optical Ranging Using Low Coherence Interferometry," Applied Optics, 30:21:2975-2979, Jul. 20, 1991.

de Groot et al.; "Three-dimensional imaging by sub-Nyquist sampling of white-light interfergrams"; Optics Letters vol. 18, No. 17; pp. 1462-1464, Sep. 1, 1993.

de Groot, "Extending the unambiguous range of two-color interferometers", Applied Optics, vol. 33, No. 25, pp. 5948-5953 (Sep. 1, 1994).

de Groot, "Three-color laser-diode interferometer", Applied Optics, Vol. 30, No. 25, pp. 3612-3616 (Sep. 1, 1991).

Debnath, S.K., et al., "Spectrally resolved phase-shifting interferometry of transparent thin films: sensitivity of thickness measurements," Appl. Opt. 45, 34 8636-8640 (2006).

Deck et al., "Two-color light-emitting-diode source for high-precision phase-shifting interferometry", Optics Letters, vol. 18, No. 22, pp. 1899-1901 (Nov. 15, 1993).

Gale et al., "Linnik microscope imaging of integrated circuit structures", Applied Optics vol. 35, No. 1, pp. 131-148 (Jan. 1, 1996).

Ghiglia et al., "Quality-Guided Path Following", Two-Dimensional Phase Unwrapping—Theory, Algorithms and Software, John Wiley & Sons publishers, ISBN 0-471-24935-1, pp. 122-136 (1998).

Kleinknecht, et al., "Linewidth measurement on IC masks and wafers by grating test patterns," Appl. Opt. 19(4), 523-533 (1980).

Kohlhaas, A. Fromchen, C. and Brinkmeyer, E., "High-Resolution OCDR for Testing Integrated-Optical Waveguides: Dispersion-Corrupted Experimental Data Corrected by a Numerical Algorithm", Journal of Lightwave Technology, Nov. 1991, vol. 9, No. 11.

Naqvi, et al., "Linewidth measurement of gratings on photomasks: a simple technique," Appl. Opt., 31(10), 1377-1384 (1992).

Novak et al., "Template-based software for accurate Mems characterization", Proceedings of SPIE, Fol. 4980, pp. 75-80 (2003).

Onodera et al., "Two-wavelength interferometry that uses a Fourier-transform method", Applied Optics, vol. 37, No. 34, pp. 7988-7994 (Dec. 1, 1998).

Peng, S.T., et al., "Theory of Periodic Dielect Waveguides," IEEE Trans Microwave Theory and Technique MTT-23(1), 123-133 (1975).

Pfortner et al., "Red-green-blue interferometer for the metrology of discontinuous structures", Applied Optics, vol. 42, No. 4, pp. 667-673 (Feb. 1, 2003).

Raymond, C.J., "Scatterometry for Semiconductor Metrology," in Handbook of silicon semiconductor metrology, A.J. Deibold, ED. (Marcel Dekker, Inc., New York 2001).

Raymond, et al., "Scatterometry for CD measurements of etched structures," SPIE 2725, 720-728 (1996).

Tzannes et al., Measurement of the modulation transfer function of infrared cameras, Optical Engineering, vol. 34, No. 6, pp. 1808-1817 (Jun. 1995), cited by other.

Youngquist, R. C. Carr, S. and Davies, D. E. N., "Optical Coherence-Domain Reflectometry: a New Optical Evaluation Technique", Optical Letters, Mar. 1987, vol. 12, No. 3.

Zhan, Q., et al., "Measurement of surface features beyond the diffraction limit with an imaging ellipsometer," Opt. Lett. 27, 821-823 (2002).

I. Abdulhalim. "Spectroscopic interference microscopy technique for measurement of layer parameters". Measurement Science and Technology 12:1996-2001, 2001.

C. Akcay et al., "Spectral shaping to improve the point spread function in optical coherence tomography", *Optics Letters*, vol. 28 No. 20, pp. 1921-1923 (Oct. 15, 2003).

R.M.A. Azzam et al., "Reflection and Transmission of Polarized Light by Stratified Planar Structures", *Ellipsometry and Polarized Light*, Elsevier Science B.V. ISBN 0 444 87016 4 (Paperback) pp. 267-363 (1987).

R.M.A. Azzam et al, "Ellipsometric function of a film-substrate system: Applications to the design of reflection-type optical devices and to ellipsometry", *Journal of the Optical Society of America*, vol. 5, No. 3, pp. 252-260.

M. Bashkansky et al., "Signal Processing for Improving Field Cross-correlation Function in Optical Coherence Tomography", *Supplement to Optics & Photonics News*, 9(5) (May, 1998).

Berman et al., "Review of in Situ & In-line Detection for CMP Applications", *Semiconductor Fabtech - $8^{th\ Edition}$*, pp. 267-274.

A. Bosseboeuf et al., "Application of microscopic interferometry techniques in the MEMS field", *Proceedings of SPIE*, vol. 5145, pp. 1-16 (2003).

M. Davidson et al., "An Application of Interference Microscopy to Integrated Circuit Inspection and metrology", *Proceedings SPIE*, vol. 775, pp. 233-247 (1987).

T. Dresel et al., "Three-dimensional sensing of rough surfaces by coherence radar", *Applied Optics*, vol. 31, No. 7, pp. 919-925 (Mar. 1, 1992).

J.E. Greivenkamp, "Generalized data reduction for heterodyne interferometry", *Optical Engineering.*, vol. 23 No. 4, pp. 350-352 (Jul./Aug. 1984).

P. de Groot et al. "Angle-resolved three-dimensional analysis of surface films by coherence scanning interferometry". Optics Letters 32(12): 1638-1640, Jun. 2007.

Peter de Groot, "Derivation of algorithms for phase-shifting interferometry using the concept of a data-sampling window", *Applied Optics*, vol. 34, No. 22, pp. 4723-4730 (Aug. 1, 1995).

Peter de Groot, "Phase-shift calibration errors in interferometers with spherical Fizeau cavities", *Applied Optics*, vol. 34, No. 16, pp. 2856-2863 (Jun. 1, 1995).

de Groot, et al., "Signal modeling for low-coherence height-scanning interference microscopy", Applied Optics, vol. 43, No. 25 (Sep. 1, 2004).

P. de Groot et al., "Signal modeling for modern interference microscopes", *SPIE Proceedings*, 5457-4 (2004).

Peter de Groot et al., "Determination of fringe order in white-light interference microscopy", *Appl. Opt.*, 41(22) pp. 4571-4578 (2002).

de Lega, Xavier Colonna et al., "Optical Topography Measurement of Patterned Wafers", *American Institute of Physics Conference Proceedings*, vol 788, pp. 432-436 (2005).

Feke, Gilbert D. et al., "Interferometric back focal plane microellipsometry", *Applied Optics*, vol. 37, No. 10, pp. 1796-1802 (Apr. 1, 1998).

P.A. Flournoy et al., "White-light interferometric thickness gauge", *Appl. Opt.*, 11(9), pp. 1907-1915 (1972).

G. Hausler et al., "Coherence Radar and Spectral Radar—New Tools for Dermatological Diagnosis", *Journal of Biomedical Optics*, vol. 3, No. 1, pp. 21-31 (Jan. 1998).

E. Hecht, "Basics of Coherence Theory", *Optics*, Second Edition, Addison Wesley, pp. 516-517 (1987).

R.D. Holmes et al., "Scanning microellipsometry for extraction of true topograpy", *Electronics Letters*, vol. 31, No. 5, pp. 358-359 (Mar. 2, 1995).

Kim, Seung-Woo et al., "Thickness-profile measurement of transparent thin-film layers by white-light scanning interferometry", *Applied Optics*, vol. 38, No. 28, pp. 5968-5973 (Oct. 1,1999).

Kino, Gordon S. et al., "Mirau correlation microscope", *Applied Optics*, vol. 29, No. 26, pp. 3775- 3783 (Sep. 10, 1990).

Kieran G. Larkin, "Efficient nonlinear algorithm for envelope detection in white light interferometry", *Journal of the Optical Society of America A*, vol. 13, No. 4, pp. 832-843 (1996).

Kujawinska, Malgorzata, "Spatial Phase Measurement Methods", *Interferogram Analysis: Digital Fringe Pattern Measurement Techniques*, IOP Publishing Ltd. 1993, pp. 141-193.

Lee et al., "Profilometry with a coherence scanning microscope", *Appl. Opt.*, 29(26), pp. 3784-3788 (1990).

I. Lee-Bennett, "Advances in non-contacting surface metrology", *OF&T Workshop*, papter OTuC1 (2004).

K. Leonhardt et al., "Micro-Ellipso-Height-Profilometry", *Optics Communications*, vol. 80, No. 3, 4, pp. 205-209 (Jan. 1, 1991).

Y. Liu et al., "Common path interferometric microellipsometry", *SPIE*, vol. 2782, pp. 635-645 (1996).

Lyakin et al., "The interferometric system with resolution better than coherence length for determination of geometrical thickness and refractive index of a layer object", *Proceedings of the SPIE—The International Society for Optical Engineering SPIE-INT. Soc. Opt. Eng USA*, vol. 4956, pp. 163-169 (Jul. 2003).

C.J. Morgan, "Least-Squares estimation in phase-measurement interferometry", *Optics Letters*, 7(8), pp. 368-370 (1982).

Ngoi et al., "Phase-shifting interferometry immune to vibration", *Applied Optics*, vol. 40, No, 19, pp. 3211-3214 (2001).

A.V. Oppenheim et al., "10.3: The time-dependent Fourier Transform", *Discrete-Time Signal Processing*, $2^{nd}$ Edition, pp. 714-722 (Prentice Hall, New Jersey, 1999).

M.C. Park et al., "Direct quadratic polynomial fitting for fringe peak detection of white light scanning interferograms", *Optical Engineering*, vol. 39, No. 4, pp. 952-959 (2000).

S. Pettigrand et al., "Mesures 3D de topographies et de vibrations a l'echelle (sub)micrometrique par microscopie optique interferometrique", *Proc. Club CMOI, Methodes et Techniques Optiques pour l'Industrie*, (2002).

M. Pluta, "Advanced light microscopy", vol. 3, PWN—Polish Scientific Publishers (Elsevier, Amsterdam), pp. 265-271 (1993).

W.H. Press et al., "Linear Correlation", *Numerical Recipes in C*, Cambridge University Press, $2^{nd}$ Edition, pp. 636-639 (1992).

Rosencwaig, Allan et al., "Beam profile reflectometry: A new technique for dielectric film measurements", *Applied Physics Letters*, vol. 60, No. 11, pp. 1301-1303 (Mar. 16, 1992).

P. Sandoz et al., "Optical implementation of frequency domain analysis for white light interferometry", *Proceedings SPIE*, vol. 2545, pp. 221-228 (Jun. 1995).

P. Sandoz et al., "High-resolution profilometry by using phase calculation algorithms for spectroscopic analysis of white-light interferograms", *Journal of Modern Optics*, vol. 43, No. 4 , pp. 701-708 (1996).

Sandoz, Patrick "Wavelet transform as a processing tool in white-light interferometry", *Optics Letters*, vol. 22, No. 14, pp. 1065-1067 (Jul. 15, 1997).

P. Sandoz et al., "Processing of white light correlograms: simultaneous phase and envelope measurements by wavelet transformation", *SPIE*, vol. 3098, pp. 73-82 (1997).

Joanna Schmit, et al., "Extended averaging technique for derivation of error-compensating algorithms in phase-shifting interferometry", *Applied Optics*, vol. 34, No. 19, pp. 3610-3619 (Jul. 1, 1995).

U. Schnell et al., "Dispersive white-light interferometry for absolute distance measurement with dielectric multilayer systems on the target", *Optics Letters*, vol. 21, No. 7, pp. 528-530 (Apr. 1996).

J. Schwider et al., "Dispersive interferometric profilometer", *Optics Letters*, vol. 19, No. 13, pp. 995-997 (Jul. 1994).

C.W. See et al., "Scanning optical microellipsometer for pure surface profiling", *Applied Optics*, vol. 35, No. 34, pp. 6663-6668 (Dec. 1, 1996).

Shatalin, S.V. et al., "Reflection conoscopy and micro-ellipsometry of isotropic thin film structures", *Journal of Microscopy*, vol. 179, Part 3, pp. 241-252 (Sep. 1995).

C. J. R. Sheppard et al. "Effect of numerical aperture on interference fringe spacing". Applied Optics 34(22):4731-4734, Aug. 1995.

M. Totzeck, "Numerical simulation of high-NA quantitative polarization microscopy and corresponding near-fields", *Optik*, vol. 112, No. 9, pp. 399-406 (2001).

R. Tripathi et al., "Spectral shaping for non-Gaussian source spectra in optical coherence tomography", *Optics Letters*, vol. 27, No. 6, pp. 406-408 (Mar. 15, 2002).

D. Willenborg et al, "A novel micro-spot dielectric film thickness measurement system", *SPIE*, vol. 1594, pp. 322-333 (1991).

A Communication from a foreign patent office dated Mar. 9, 2005.

"Phase Shifting Interferometry", Wyant (1998).

Encyclopedia of Laser Physics and Technology, http://www.rp-photonics.com/coherence.html.

Encyclopedia of Laser Physics and Technology, http://www.rp-photonics.com/single_mode_fibers.html.

Encyclopedia of Laser Physics and Technology, http://www.rp-photonics.com/photonic_crystal_fibers.html.

Encyclopedia of Laser Physics and Technology, http://www.rp-photonics.com/supercontinuum_generation.html.

PCT Search Report dated Jun. 10, 2008.

US 7,151,607, 12/2006, de Groot et al. (withdrawn)

* cited by examiner

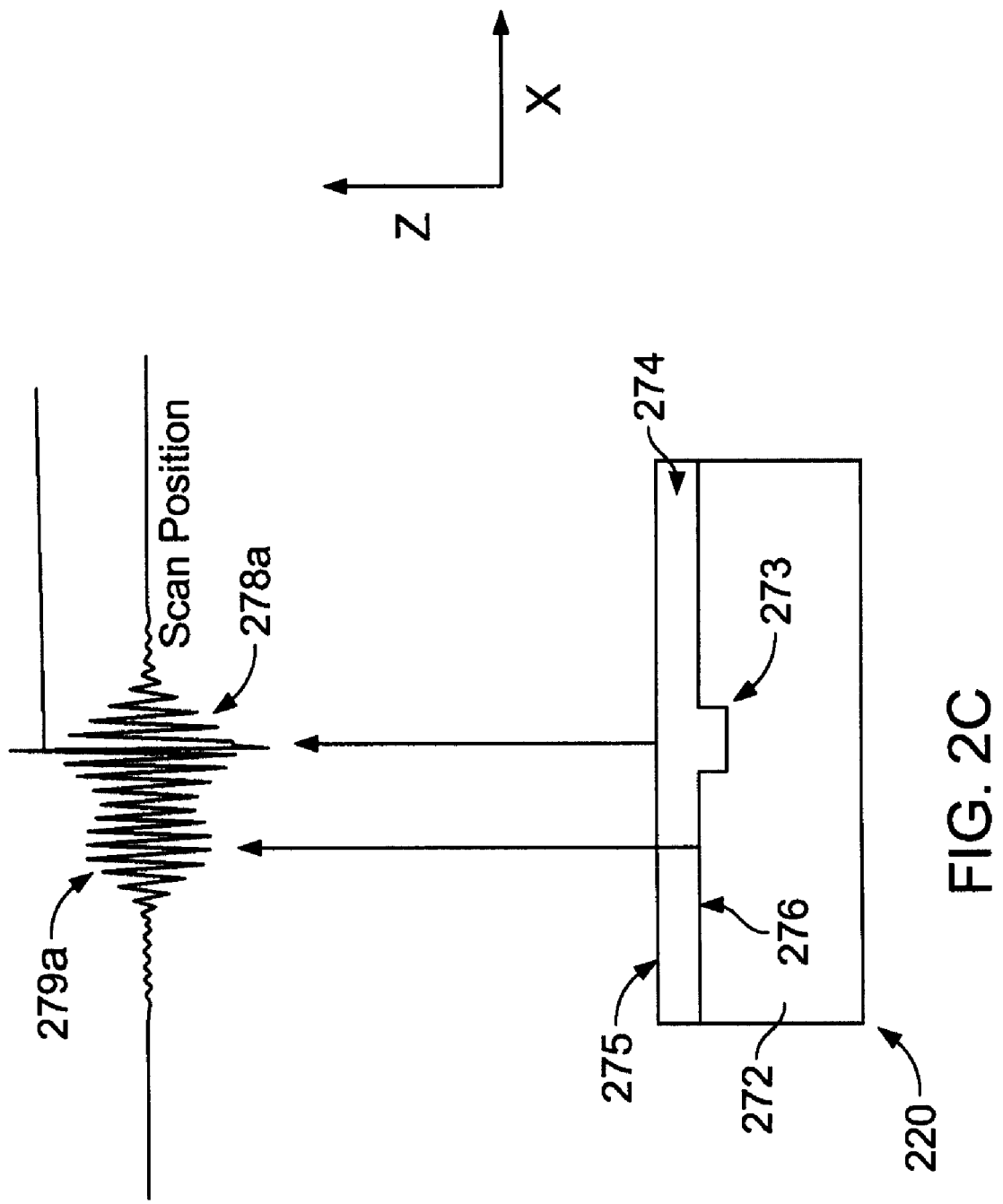

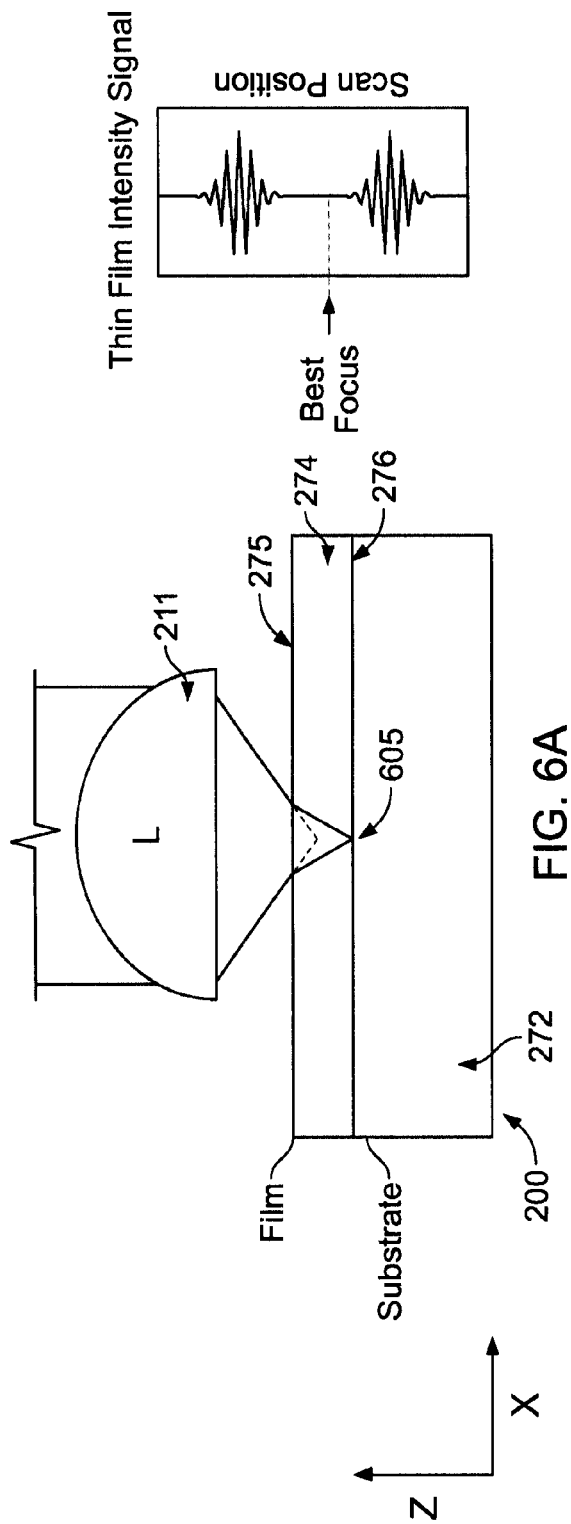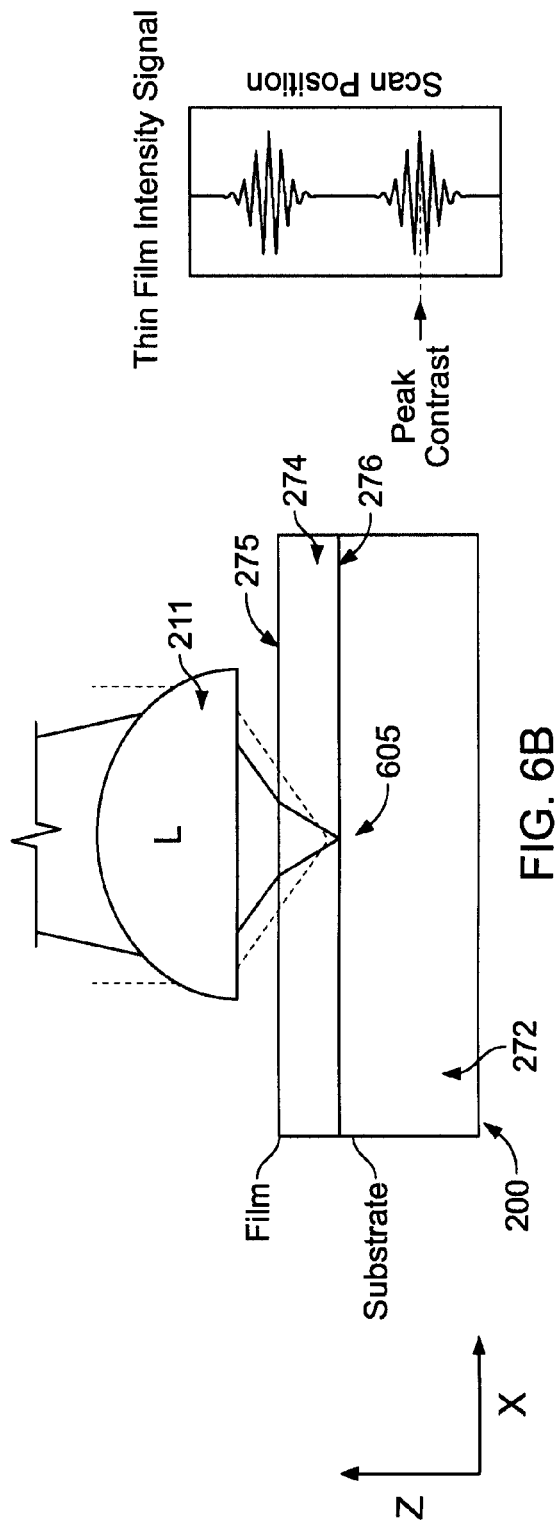

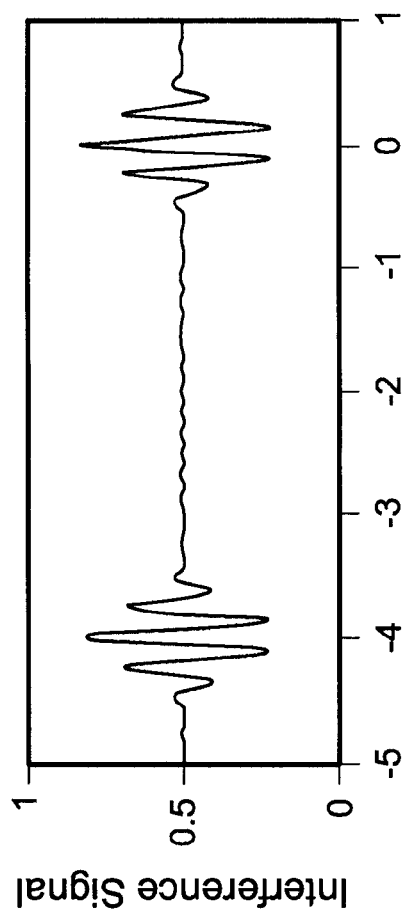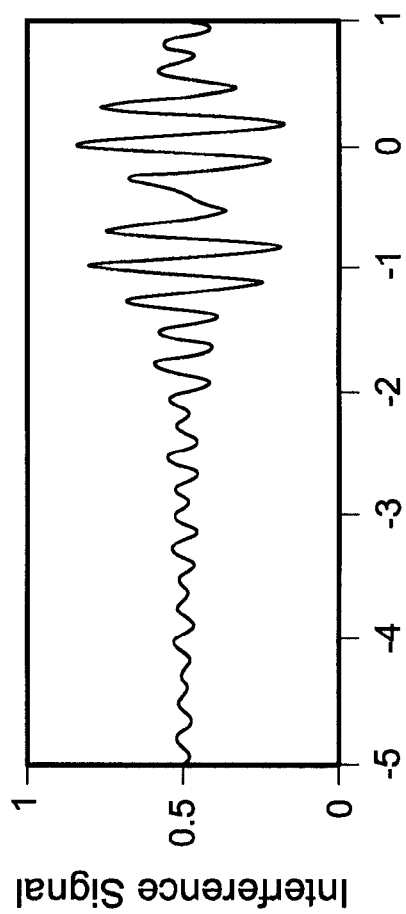

INTERFEROMETRY FOR LATERAL METROLOGY

CROSS REFERENCE TO RELATED APPLICATION

This application claims priority under 35 U.S.C. §119(e) to U.S. Provisional Patent Application 60/887,448 entitled "INTERFEROMETRY FOR LATERAL METROLOGY," filed on Jan. 31, 2007, the contents of which are incorporated by reference herein in its entirety.

BACKGROUND

This disclosure relates to interferometry, for example, to phase-shifting interferometry and perforating lateral metrology based on phase-shifted interferometry images.

Interferometric optical techniques are widely used to measure optical thickness, flatness, and other geometric and refractive index properties of precision optical and mechanical components.

For example, to measure the surface profile of an object surface, one can use an interferometer to combine an object wavefront reflected from the object surface with a reference wavefront reflected from a reference surface to form an optical interference pattern. Spatial variations in the intensity profile of the optical interference pattern correspond to phase differences between the combined object and reference wavefronts caused by variations in the profile of the object surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns, which typically span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI may be produced by changing the optical path length from the object surface to the interferometer relative to the optical path length from the reference surface to the interferometer (i.e., the "optical path length difference" between the object and reference wavefronts is varied). For example, the reference surface may be moved relative to the measurement surface. The light source may be either narrow-band source or a broadband source. In the latter case, the optical path length difference may be varied over a range larger than the coherence length of the source to localize interferometric fringes and obviate the $2\pi$ phase ambiguity otherwise present in narrow-band PSI. Such interferometry methods are referred to as "Scanning White-Light Interferometry" (SWLI) or "Scanning Broadband Interferometry," see, e.g., N. Balasubramanian in U.S. Pat. No. 4,340,306 and Colonna de Lega et al. in U.S. Pat. No. 6,195,168, respectively.

While PSI can extract surface height information from interferometric fringes in the phase-shifted optical interference patterns or images, those same interference fringes can obscure lateral metrology features in the images, such as linewidths or x, y feature positions. To obtain such lateral metrology images, state-of-the-art lateral metrology generally relies on reflected intensity profiles generated by conventional non-interferometric imaging systems.

SUMMARY

The inventors have realized that an interferometric profiler such as, for example, a broadband or low coherence interferometer, can provide lateral metrology of structures buried in or under a single or multilayer film. Phase-shifted interference patterns measured by the profiler are processed to provide a surface height profile and/or fringe-free reflected intensity profile (i.e. an image substantially free of optical interference fringes) of the buried structure suitable for lateral metrology. The surface height or reflected intensity profile can be analyzed to determine lateral metrology characteristics, such as line widths or lateral feature positions.

The inventors have also realized that, in applications where a scanning interferometric profiler measures a reflected intensity profile of a buried structure, the interferometric data obtained by the profiler can be analyzed to determine the scan position at which the profiler produces a well focused image of the buried structure. In general, this position of best focus does not correspond to the position of maximum fringe contrast of the measured interference signals. The best focus information can be used to provide well focused reflected intensify profile of the buried structure. This reflected intensity profile can then be analyzed to determine lateral metrology characteristics, such as line widths or lateral feature positions of the buried structure.

We now generally summarize different aspects and features of the invention.

In one aspect, a method includes: using a scanning interferometry system, generating a sequence of phase-shifted interferometry images at different scan positions of an object comprising a buried surface; identifying a scan position corresponding to a position of best focus for the buried surface based on the sequence of phase-shifted interferometry images of the object; and generating a final image based on the phase-shifted interferometry images and the scan position, where the interferometric fringes in the final image are reduced relative to the interferometric fringes in the phase-shifted interferometry images. Some embodiments include outputting information about the buried surface based on the image.

In some embodiments, the scanning interferometer includes a reference surface, and generating the sequence of phase-shifted interferometry images includes varying the optical path length between light collected from the object and light collected from the reference surface. In some embodiments, varying the optical path length includes translating the object relative to the reference surface.

In some embodiments, generating the final image includes: selecting a plurality of phase shifted interferometry images from the sequence of phase-shifted images interferometry; and calculating an average of the selected phase-shifted interferometry images to produce a final image. In some embodiments, the phase shift between adjacent selected phase-shifted interferometry images is a constant. For example, In some embodiments, the constant multiplied by the number of selected phase-shifted interferometry images is equal to an integer multiple of 2π. In some embodiments, the average is an unequally weighted average.

In some embodiments, the selecting a plurality of phase-shifted interferometry images includes selecting images at scan positions near the scan position corresponding to the position of best focus for the buried surface.

Some embodiments include determining lateral metrology information about the buried surface based on the final image. For example, in some embodiments, the lateral metrology information includes the lateral position of one or more surface features. For example, some embodiments, lateral metrology information includes the lateral size of one or more surface features and/or the lateral spacing of two or more surface features.

In some embodiments, the determining lateral metrology information about the buried surface based on the final image includes using machine vision. For example some embodiments include using machine vision to detect an edge of a surface feature.

Some embodiments further include determining additional information about the object based on the phase-shifted interferometry images. For example, some embodiments include determining information about the object based on the lateral metrology information and the additional information about the object. In various embodiments, the additional information about the object includes spatial information about the object and/or material property information about the object. For example, in some embodiments the object includes a thin film, and the additional information about the object includes a thin film thickness and/or an optical property of the film.

In some embodiments, the object includes a second surface, and where the lateral metrology information includes a position of a surface feature of the second surface relative to a position of a surface feature of the buried surface.

In some embodiments, the interferometry system is a low-coherence scanning interferometry system.

In some embodiments, the interferometry system is a wavelength-tuning interferometry system.

In some embodiments, the final image is a fringe-free intensity image. For example, in some embodiments, generating the sequence of phase-shifted interferometry images includes: interfering a pair of wavefronts derived from a common source, where one of the wavefronts reflects from the object surface and the other wavefront reflects from the reference surface, and introducing a sequence of phase-shifts between the interfering wavefronts. In some embodiments, each of the phase-shifted interferometry images corresponds to an intensity image formed by the interfering wavefronts for a corresponding one of the phase shifts. In some embodiments, introducing the sequence of phase shifts includes varying an optical path length difference between the interfering wavefronts. For example, in some embodiments, the optical path length difference is varied over a range comparable to, or larger than, the coherence length of the source.

In some embodiments, generating the sequence of phase-shifted interferometry images at different scan positions of an object comprising a buried surface includes for each location on the object, generating an intensity signal for the different scan positions.

In some embodiments, identifying a scan position corresponding to the position of best focus for the buried surface includes identifying the position of best focus based on a fringe contrast of the intensity signals.

Some embodiments include determining a scan position of localized fringe contrast corresponding to the buried surface for one or more of the intensity signals and determining the scan position of best focus based on the scan positions.

In some embodiments, identifying the scan position of localized fringe contrast corresponding to the buried surface includes fitting a model function to at least one intensity signal. For example, in some embodiments, the fitting a model function to the at least one intensity signal includes a least squares fitting.

Some embodiments include correcting the scan position of high fringe contrast based on information about the object to determine the scan position of best focus. For example, in some embodiments, the information about the object includes at least one of: a film thickness, a film refractive property, a film position.

In some embodiments, the object includes a buried surface covered by a film with a top surface exposed to the ambient environment. The method further includes identifying, based on fringe contrast, a scan position T corresponding to the top surface, identifying, based on fringe contrast, a scan position C corresponding to the buried surface; and determining the scan position of best focus F based on the relation $$F = T - (T-C)/n_g^2$$

where $n_g$ is the group index of refraction of the film. Some embodiments further include determining $n_g$.

In some embodiments, the object includes a buried surface partially covered by a film with a top surface exposed to the ambient environment, such that a region of the buried surface is exposed to the ambient environment and the method includes identifying, based on fringe contrast, a scan position T corresponding to the top surface of the film; identifying, based on fringe contrast, a scan position C corresponding to the top surface; identifying, based on fringe contrast, a scan position I' corresponding to the exposed region of the buried surface; and determining the scan position of best focus F based on the relation $$F = T - \frac{(T-I')^2}{T-C}.$$

Some embodiments include outputting information about the buried surface includes controlling an integrated circuit fabrication device based on the information about the buried surface.

In another aspect, a method includes: generating, relative to a reference surface, a sequence of phase-shifted interferometry images of an object comprising a buried surface; generating a final image of the buried surface based on the phase-shifted interferometry images, where the interferometric fringes in the final image are reduced relative to the interferometric fringes in the phase-shifted interferometry images. Some embodiments include outputting information about the buried surface based on the image.

In some embodiments, the reference surface is a surface of an interferometry system, and generating the sequence of phase-shifted interferometry images includes varying the optical path length between light collected from the object and light collected from reference surface.

In some embodiments, varying the optical path length includes translating the object relative to the reference surface.

Some embodiments include determining lateral metrology information about the buried surface based on the final image. For example, the lateral metrology information may include the lateral position of one or more surface features, the lateral size of one or more surface features, and/or the lateral spacing of two or more surface features.

In some embodiments, the determining lateral metrology information about the buried surface based on the final image includes using machine vision. For example, some embodiments include using machine vision to detect an edge of a surface feature.

In some embodiments, the determining lateral metrology information includes determining a first parameter characterizing a surface feature and determining a second parameter characterizing a surface feature based on the first parameter.

Some embodiments include determining additional information about the object based on the phase-shifted interferometry images. Some embodiments include determining information about the object based on the lateral metrology information and the additional information about the object. In some embodiments, the additional information about the object includes spatial information about the object and/or material property information about the object. For example the object includes a thin film, and the additional information about the object includes a thin film thickness and/or an optical property of the film.

In some embodiments, the object includes a second surface, and the lateral metrology information includes a position of a surface feature on the second surface relative to a position of a surface feature on the buried surface.

In some embodiments, the generating the final image includes: selecting a plurality of phase shifted images from the sequence of phase-shifted images; and calculating an average of the selected phase-shifted interferometry images to produce a final image. In some embodiments, the phase shift between adjacent selected phase-shifted interferometry images is a constant. For example, in some embodiments the constant multiplied by the number of selected phase-shifted interferometry images is equal to an integer multiple of $2\pi$. In some embodiments, the average is an unequally weighted average.

In some embodiments, the interferometry system is a low coherence interferometry system, and the method includes generating a sequence of phase-shifted interferometry images of the object at different scan positions; identifying a scan position corresponding to the buried surface; selecting a plurality of phase-shifted interferometry images from the sequence based on the scan position; and generating a final image based on the selected phase-shifted interferometry images In some embodiments, generating a sequence of phase-shifted interferometry images of the object at different scan positions includes: for each location on the object generating an intensity signal for the different scan positions, identifying the scan position corresponding to the buried surface based on a fringe contrast of the intensity signals.

In some embodiments, identifying the scan position includes fitting a model function to the intensity signals. For example, in some embodiments the fitting a model function to the intensity signals includes a least squares fitting.

In some embodiments, the selecting a plurality of phase-shifted interferometry images includes selecting images at scan positions near the scan position corresponding to the buried surface.

Some embodiments include, using the interferometry system to provide the sequence of phase-shifted interference patterns of the buried surface. In some embodiments, the interferometry system is a white-light scanning interferometry system. In some embodiments, the interferometry system is a wavelength-tuning interferometry system. For example, in some embodiments, the final image is a fringe-free intensity image.

In some embodiments, generating the sequence of phase-shifted interferometry images includes: interfering a pair of wavefronts derived from a common source, where one of the wavefronts reflects from the object surface and the other wavefront reflects from the reference surface, and introducing a sequence of phase-shifts between the interfering wavefronts.

In some embodiments, outputting information about the buried surface includes controlling an integrated circuit fabrication device based on the information about the buried surface.

In some embodiments, the object includes at least two buried surfaces. Some such embodiments further include: using a scanning interferometry system, for each of the at least two buried surfaces, generating a respective sequence of phase-shifted interferometry images at different scan positions of the object; for each of the at least two buried surfaces, identifying a respective scan position corresponding to the position of best focus for the respective buried surface based on the respective sequence of phase-shifted interferometry images of the object; for each of the at least two buried surfaces, generating a respective final image based on the respective phase-shifted interferometry images and the scan position corresponding to the position of best focus for the respective buried surface, where the interferometric fringes in the respective final image are reduced relative to the interferometric fringes in the respective phase-shifted interferometry image. Some embodiments include outputting information about the at least two buried surfaces based on the images. Some embodiments further include combining the respective final images to produce a composite image.

In another aspect, a method includes generating, relative to a reference surface, a sequence of phase-shifted interferometry images of an object comprising a buried surface; generating a surface height profile of a buried surface of the object based on the sequence of phase-shifted interferometry images; and determining lateral metrology information about the buried surface based on the surface height profile of the buried surface. Some embodiments include outputting information about the buried surface based on the surface height profile.

In some embodiments, the reference surface is a surface of an interferometry system, and generating the sequence of phase-shifted interferometry images includes varying the optical path length between light collected from the object and light collected from the reference surface. In some embodiments, varying the optical path length includes translating the object relative to the reference surface.

Some embodiments include generating a lateral metrology image based on the surface height profile.

In some embodiments, determining lateral metrology information includes determining information based on the lateral metrology image.

In some embodiments, determining lateral metrology information includes determining information based on the lateral metrology image using machine vision. For example some embodiments include using machine vision to detect an edge of a surface feature.

In some embodiments, the lateral metrology information includes the lateral position of one or more surface features. For example, the lateral metrology information includes the lateral size of one or more surface features, the and/or the lateral spacing of two or more surface features.

Some embodiments include determining additional information about the object based on the phase-shifted interferometry images. For example, some embodiments include determining information about the object based on the lateral metrology information and the additional information about the object. In some embodiments, the additional information about the object includes spatial information about the object. In some embodiments, the additional information about the object includes material property information about the object.

In some embodiments, the object includes a thin film, and the additional information about the object includes a thin film thickness and/or an optical property of the film.

In some embodiments, the object includes a second surface, and the lateral metrology information includes a position of a surface feature of the second surface relative to a position of a surface feature of the buried surface.

In some embodiments, the determining additional information about the object based on the phase-shifted interferometry images includes generating a final image of the buried surface based on the phase-shifted interferometry images, where the interferometric fringes in the final image are reduced relative to the interferometric fringes in the phase-shifted interferometry images.

In some embodiments, the final image corresponds to the position of best focus of the interferometry system.

In some embodiments, the determining lateral metrology information includes: determining a first parameter characterizing a surface feature and determining a second parameter characterizing a surface feature based on the first parameter.

In some embodiments, generating the sequence of phase-shifted interferometry images includes: interfering a pair of wavefronts derived from a common source, where one of the wavefronts reflects from the object surface and the other wavefront reflects from the reference surface, and introducing a sequence of phase-shifts between the interfering wavefronts.

In some embodiments, each of the phase-shifted interferometry images corresponds to an intensity image formed by the interfering wavefronts for a corresponding one of the phase shifts.

In some embodiments, introducing the sequence of phase shifts includes varying an optical path length difference between the interfering wavefronts. For example, in some embodiments the optical path length difference is varied over a range comparable to, or larger than, the coherence length of the source.

Some embodiments include using the interferometry system to provide the sequence of phase-shifted interference patterns of the buried surface.

For example, in some embodiments, the interferometry system is a white-light scanning interferometry system or a wavelength-tuning interferometry system.

In some embodiments, outputting information about the buried surface includes controlling an integrated circuit fabrication device based on the information about the buried surface.

In another aspect, an apparatus includes a computer readable medium which causes a processor to: generate a final image of a buried surface in an object based on a sequence of phase-shifted interferometry images of the object where the interferometric fringes in the final image are reduced relative to the interferometric fringes in the phase-shifted interferometry images.

In another aspect, an apparatus includes a computer readable medium which causes a processor to generate a surface height profile of a buried surface of an object based on a sequence of phase-shifted interferometry images of the object; determine lateral metrology information about the buried surface based on the surface height profile.

In another aspect, an apparatus includes a computer readable medium which causes a processor to: generate a final image, at a position of best focus of a buried surface in an object, based on a sequence of phase-shifted interferometry images of the object where the interferometric fringes in the final image are reduced relative to the interferometric fringes in the phase-shifted interferometry images.

In another aspect, an apparatus includes an interferometer which, during operation, generates, relative to a reference surface, a sequence of phase-shifted interferometry images of an object comprising a buried surface; and an electronic controller coupled to the interferometer which, during operation, generates a final image of the buried surface based on the phase-shifted interferometry images, where the interferometric fringes in the final image are reduced relative to the interferometric fringes in the phase-shifted interferometry images and outputs information based on the final image. In some embodiments, during operation the electronic controller generates a surface height profile of a buried surface of the object based on the sequence of phase-shifted interferometry images; determines additional lateral metrology information about the buried surface based on the surface height profile.

In some embodiments, the interferometer includes one of: a Linnik interferometer, a Michelson interferometer, a Fizeau interferometer.

In some embodiments, the interferometer includes a scanning interferometer comprising a broadband source having a coherence length. During operation the scanning interferometer interferes an object wavefront reflected from the object with a reference wavefront reflected from the reference surface and varies an optical path length difference between the wavefronts over a range larger than the coherence length of the source.

In some embodiments, the interferometer includes an unequal path length interferometer comprising a tunable source. During operation the unequal path length interferometer introduces phase shifts between an object wavefront reflected from the object and a reference wavefront reflected from the reference surface by varying the wavelength of the source.

In another aspect, an apparatus includes: an interferometer which, during operation, generates, relative to a reference surface, a sequence of phase-shifted interferometry images of an object comprising a buried surface; and an electronic controller coupled to the interferometer which, during operation, generates a surface profile of a buried surface of the object based on the sequence of phase-shifted interferometry images lateral metrology information about the buried surface based on the surface profile, and outputs the information.

In some embodiments, the electronic controller, during operation, additionally generates a final image based on the phase-shifted interferometry images. The interferometric fringes in the final image are reduced relative to the interferometric fringes in the phase-shifted interferometry images and outputs information based on the image.

In some embodiments, the interferometer includes one of: a Linnik interferometer, a Michelson interferometer, a Fizeau interferometer.

In some embodiments, the interferometer includes a scanning interferometer comprising a broadband source having a coherence length. During operation the scanning interferometer interferes an object wavefront reflected from the object with a reference wavefront reflected from the reference surface and varies an optical path length difference between the wavefronts over a range larger than the coherence length of the source.

In some embodiments, the interferometer includes an unequal path length interferometer comprising a tunable source, where during operation the unequal path length interferometer introduces phase shifts between an object wavefront reflected from the object and a reference wavefront reflected from the reference surface by varying the wavelength of the source.

In another aspect, and apparatus includes a scanning interferometer which, during operation generates a sequence of phase-shifted interferometry images at different scan positions of an object comprising a buried surface; and an electronic controller coupled to the interferometer which, during operation: identifies a scan position corresponding to the position of best focus for the buried surface based on the sequence of phase-shifted interferometry images of the object; generates a final image based on the phase-shifted interferometry images and the scan position. The interferometric fringes in the final image are reduced relative to the interferometric fringes in the phase-shifted interferometry images;

In some embodiments, during operation, the electronic controller selects a plurality of phase shifted interferometry images from the sequence of phase-shifted images interferometry and calculates an average of the selected phase-shifted interferometry images to produce a final image.

In some embodiments, the selected images include images at scan positions near the scan position corresponding to the position of best focus for the buried surface.

In some embodiments, the interferometer includes one of: a Linnik interferometer, a Michelson interferometer, a Fizeau interferometer.

In some embodiments, the scanning interferometer includes a broadband source having a coherence length, which, during operation, interferes an object wavefront reflected from the object with a reference wavefront reflected from the reference surface and varies an optical path length difference between the wavefronts over a range larger than the coherence length of the source. Some embodiments include a translation stage configured to vary the distance between the object and the reference surface.

In some embodiments, each of the phase-shifted interferometry images corresponds to an intensity image formed by the interfering wavefronts for a corresponding one of the phase shifts. In some embodiments, introducing the sequence of phase shifts includes varying an optical path length difference between the interfering wavefronts. In some embodiments, the optical path length difference is varied over a range comparable to, or larger than, the coherence length of the source.

As used herein, "position of best focus" or "scan position of best focus" refers to the scan position of a scanning interferometer at which a buried surface of interest is brought into focus by the interferometer. That is, it is a scan position where the buried surface of interest is within the depth of field of the scanning interferometer's objective. An estimate for total depth of field DOF is given by:

$$DOF = \frac{\lambda_0 n}{NA^2} + \frac{n}{M \times NA} e \qquad \text{Eq. (1)}$$

where $\lambda_0$ is the central wavelength of illuminating light, n is the refractive index of the medium between the test object and the objective element of the interferometer objective, and NA equals the objective numerical aperture. The variable e is the smallest distance that can be resolved by a detector that is placed in the image plane of the microscope objective, whose lateral magnification is M.

As used herein, "light" is not limited to electromagnetic radiation in the visible spectral region, but rather refers generally to electromagnetic radiation in any of the ultraviolet, visible, near infrared, and infrared spectral regions.

It is to be understood that "outputting information about the buried surface" includes, but is not limited to, outputting to a user display, a printer, a machine-readable medium or storage device, a electronic controller, etc. Outputting can also include automatically controlling one or more devices. Such devices may include, but are not limited to, devices associated with integrated circuit manufacturing.

Unless otherwise defined, all technical and scientific terms used herein have the same meaning as commonly understood by one of ordinary skill in the art to which this invention belongs. In case of conflict with any document incorporated by reference, the present disclosure controls.

Other features, objects, and advantages of the invention will be apparent from the following detailed description.

BRIEF DESCRIPTION OF THE DRAWINGS

FIG. 2c shows an exemplary interference intensity signal generated by interferometry system 200.
FIG. 6a illustrates scanning interferometry system 200 at the scan position at which the image of buried surface 276 is well focused at camera 240.
FIG. 6b illustrates scanning interferometry system 200 at the scan position of peak contrast corresponding to buried surface 276.
FIGS. 11a and 11b show model interference intensity signals for an object with a thin film.

Like reference numerals in different drawings refer to common elements.

DETAILED DESCRIPTION

In an embodiment, a scanning white light interferometry (SWLI) system provides an interferometric profiling measurement of a test object. An example of a typical scanning interferometer is the Mirau-type scanning interferometry system 200 shown in FIG. 1.

Figure 1:
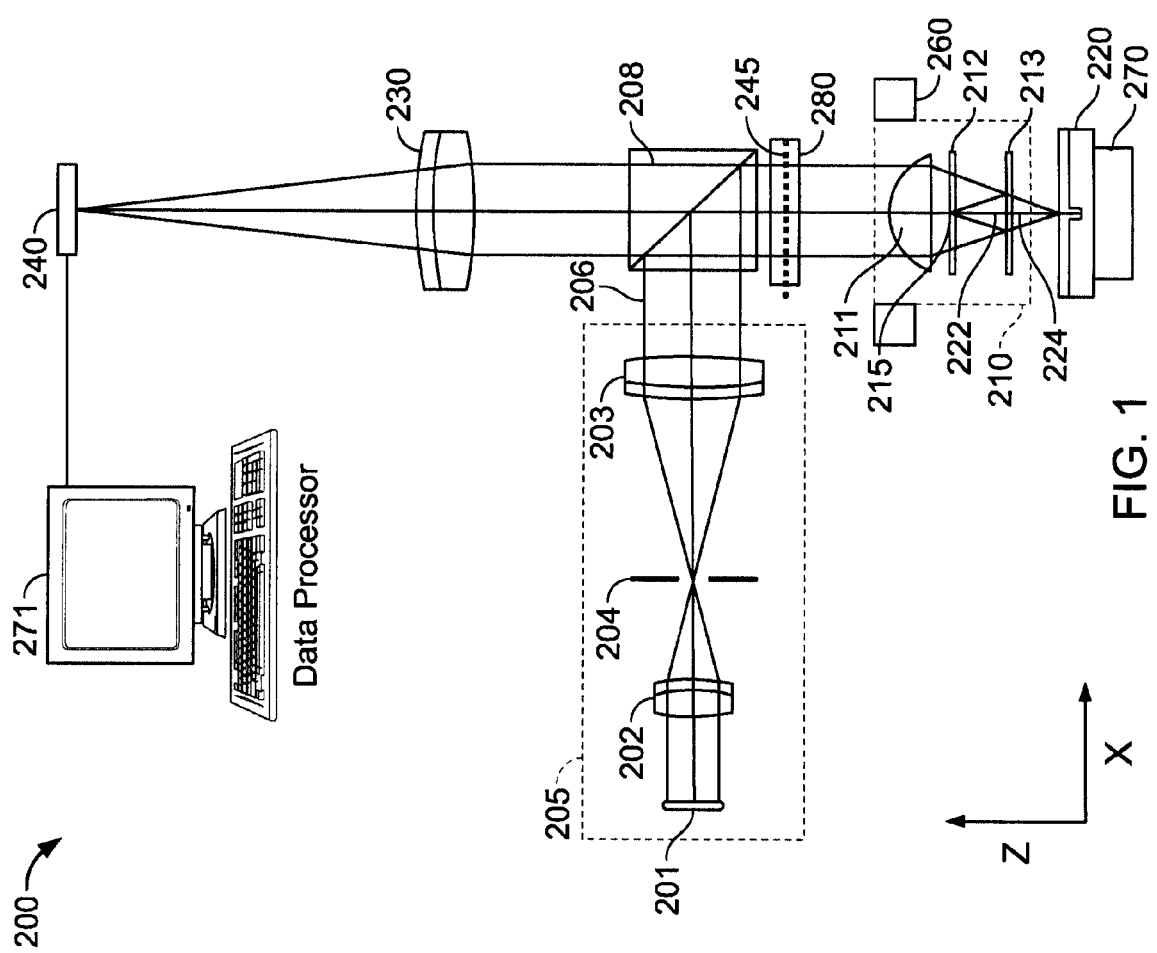
FIG. 1 shows scanning interferometry system 200

Referring to FIG. 1, a low coherence (e.g., spectrally broadband or spatially extended) source module 205 provides illumination light 206 to a beam splitter 208, which directs it to a Mirau interferometric objective assembly 210. Assembly 210 includes an objective lens 211, a reference flat 212 having a reflective coating on a small central portion thereof defining a reference mirror 215, and a beam splitter 213. During operation, objective lens 211 focuses the illumination light towards a test sample 220 through reference flat 212. Beam splitter 213 reflects a first portion of the focusing light to reference mirror 215 to define reference light 222 and transmits a second portion of the focusing light to test sample 220 to define measurement light 224. Then, beam splitter 213 recombines the measurement light reflected (or scattered) from test sample 220 with reference light reflected from reference mirror 215, and objective 211 and imaging lens 230 image the combined light to form an interference pattern on detector (e.g., a multi-pixel camera) 240. Because the interference pattern is imaged onto the detector, each pixel of camera 240 acquires an interference signal corresponding to a different lateral (i.e., x-y) location on test object 220. The measurement signal from the detector is sent to a computer 21.

The scanning in the embodiment of FIG. 1 is accomplished by piezoelectric transducer (PZT) 260 coupled to Mirau interferometric objective assembly 210, which is configured to scan assembly 210 as a whole relative to test sample 220 along the optical axis of objective 211 to provide the scanning interferometry data at each pixel of camera 240. In typical embodiments, the interferometry data is stored as a sequence of interference patterns taken at different phase shifts during the PZT scan. Alternatively, the PZT may be coupled to the test sample rather than assembly 210 to provide the relative motion there between, as indicated by PZT actuator 270. In yet further embodiments, the scanning may be provided by moving one or both of reference mirror 215 and beam splitter 213 relative to objective 211 along the optical axis of objective 211. In typical embodiments, the interferometry data is stored by computer 271 as a sequence of interference patterns taken at different phase shifts during the PZT scan.

Figure 2A:
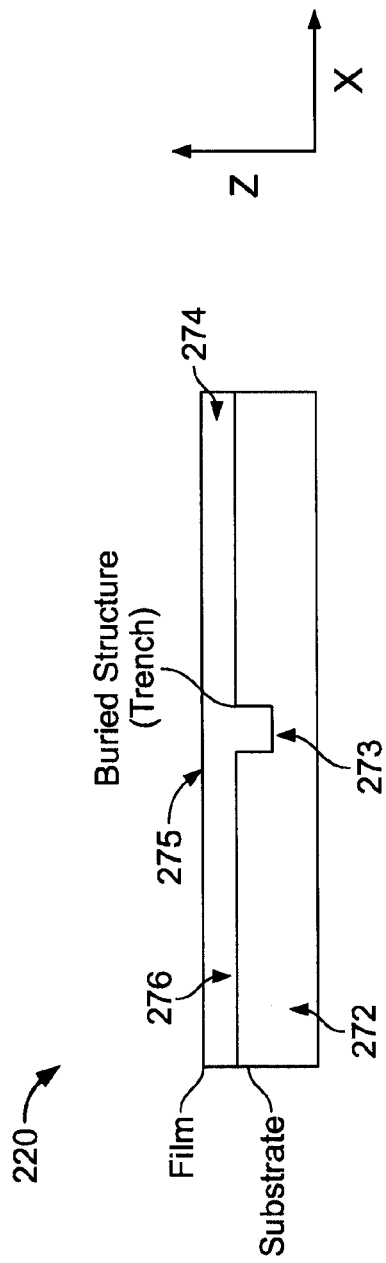
FIG. 2a shows details of test object 220 from FIG. 1

FIG. 2a shows the cross section of an exemplary test object 220 having a buried feature in a substrate 272, in this case a trench 273, underneath a single-layer film 274. Sample 220 includes two interfaces, namely air-film interface (i.e. top surface) 275 and film-substrate interface (i.e. buried surface) 276.

Figure 2B:
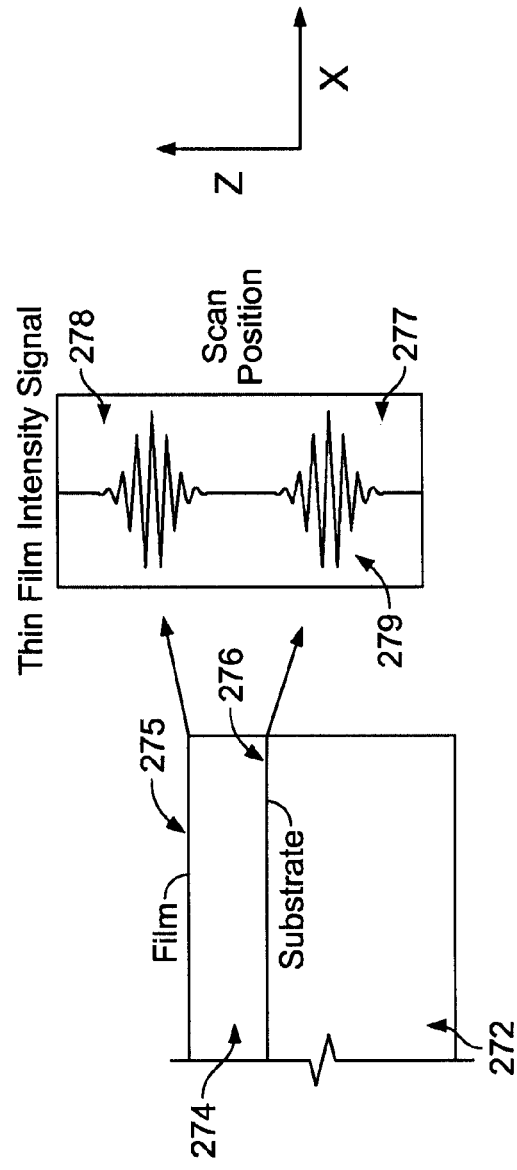
FIG. 2b shows an exemplary interference intensity signal generated by interferometry system 200.

FIG. 2b shows the SWLI signal as a function of scan position acquired at one pixel of camera 240 during the PZT scan. The PZT scan varies the optical path length difference (OPD) between the reference and measurement legs of the interferometer over a range that is larger than the coherence length of source 201. Because film 274 is sufficiently thick, the scanning interferometry intensity signal 277 will include two distinct, localized, regions of fringes 278 and 279. These regions correspond to the position of zero OPD between light reflected from reference surface 215 and light reflected from the upper interface 275 and lower interface 276 respectively.

A number of techniques have been developed to separate and analyze interference signals of the type described above to determine profiles of the film top surface and substrate top surface. Some techniques include identification of the signals corresponding to each layer by their envelope or signal strength as described in, for example, A. Bosseboeuf and S. Petigrand, "Application of microscopic interferometry techniques in the MEMS field" Proc. SPIE 5145, 1-16 (2003). A second approach is to transform the signal into the frequency domain and examine the amplitude and phase of the transformed signal to determine the location of the layers. See, for example, U.S. Pat. No. 5,398,113 entitled "METHOD AND APPARATUS FOR SURFACE TOPOGRAPHY MEASUREMENT BY SPATIAL-FREQUENCY ANALYSIS OF INTERFEROGRAMS" and U.S. Patent Publication No. US-2004-0085544-A1 entitled "INTERFEROMETRY METHOD FOR ELLIPSOMETRY, REFLECTOMETRY, AND SCATTEROMETRY MEASUREMENTS, COMPRISING CHARACTERIZATION OF THIN FILM STRUCTURES" each of which is incorporated herein by reference.

As shown in FIG. 2c, if film 274 is sufficiently thin, the fringe signals 278a and 279a corresponding to the upper interface 275 and lower interface 276 overlap, thereby complicating the analysis of the signal. Even so, a number of techniques may be used separate and analyze interference signals of this type comprising those disclosed in the above references and in U.S. patent application Ser. No. 10/941,649 entitled "METHODS AND SYSTEMS FOR INTERFEROMETRIC ANALYSIS OF SURFACES AND RELATED APPLICATIONS" published as U.S. Patent Publication No. US-2005-0078318-A1, incorporated herein by reference. In some embodiments, computer 271 may use model-based techniques to determine information for complex surface structures as described in, for example, U.S. Pat. No. 7,151,607 entitles "PROFILING COMPLEX SURFACE STRUCTURES USING SCANNING INTERFEROMETRY" and US. Pat. Pub. No. US-2006-0262321 "METHOD AND SYSTEM FOR ANALYZING LOW-COHERENCE INTERFEROMETRY SIGNALS FOR INFORMATION ABOUT THIN FILM STRUCTURES" the contents of each incorporated by reference herein.

For example, some embodiments feature a sliding-window least-squares (LSQ) procedure for analyzing low-coherence interferometry signals. The procedure can be used to accurately identify portions of the low-coherence interferometry signals corresponding to the various surfaces in a thin film stack. The procedure performs a fit sequentially through the scan by means of a least-squares optimization. The first step is to create a fitting function based on a model of the signal that one would theoretically expect to be produced by such a stack, then using one or more variable parameters, comprising an interference phase value, to optimize the fit to the actual signal at each scan position. The scan position for which the LSQ fit is most successful locates the signal, which can then be analyzed to determine information about test object 220, such as surface height.

Figure 3:
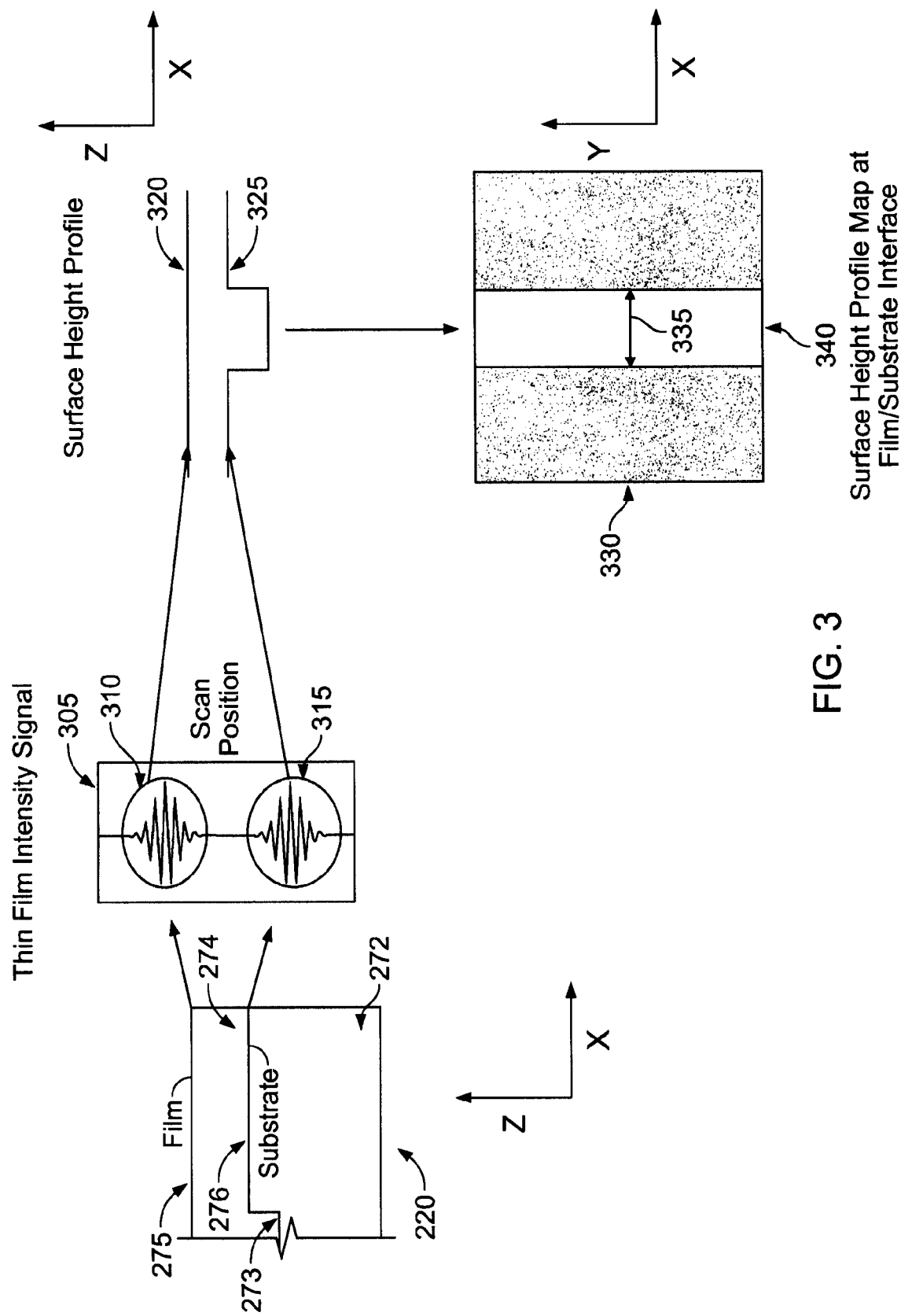
FIG. 3 illustrates a lateral metrology measurement using a surface profile.

As illustrated in FIG. 3, in one embodiment, scanning interferometry system 200 is used to perform lateral metrology of test object 220 based on surface profiles determined by a SWLI measurement. As described above, system 200 acquires SWLI data in the form of a series of interference pattern images acquired at multiple scan positions along the line of the surface height (z) coordinate. A typical interference intensity signal 305 acquired at a pixel of camera 240 is shown as a function of scan position. Interference intensity signal 305 shows areas of localized fringe contrast 310 and 315 corresponding to upper and lower interfaces 275 and 276 of test object 220.

Computer 271, using, for example, analysis techniques referenced above, analyzes the interface intensity signals to produce height profiles 320 and 325 for film 274 and substrate layer 272. Surface height data such as, for example, surface height profile map 330 are generated for buried substrate layer 272. In surface height profile map 330, higher portions of buried surface 276 of substrate 272 are indicated by darker coloring, while lower portions are indicated by light coloring, such that trench 273 is represented by a light strip running down the center of the map. Surface height profile map 330 can be analyzed to determine a lateral metrology characteristic of the buried surface such as the linewidth 335 or position 340 of trench 273. Many known machine vision techniques are readily adapted to the lateral metrology of the surface height data. For example, one such software package for performing such analysis is "Sherlock", marketed by RDP Vision Group, 5877 Huberville Ave., Dayton, Ohio 454311. Another such software package is "VISIONPRO®" from Cognex Corporation, One Vision Drive Natick, Mass. 01760-2059.

Figure 4:
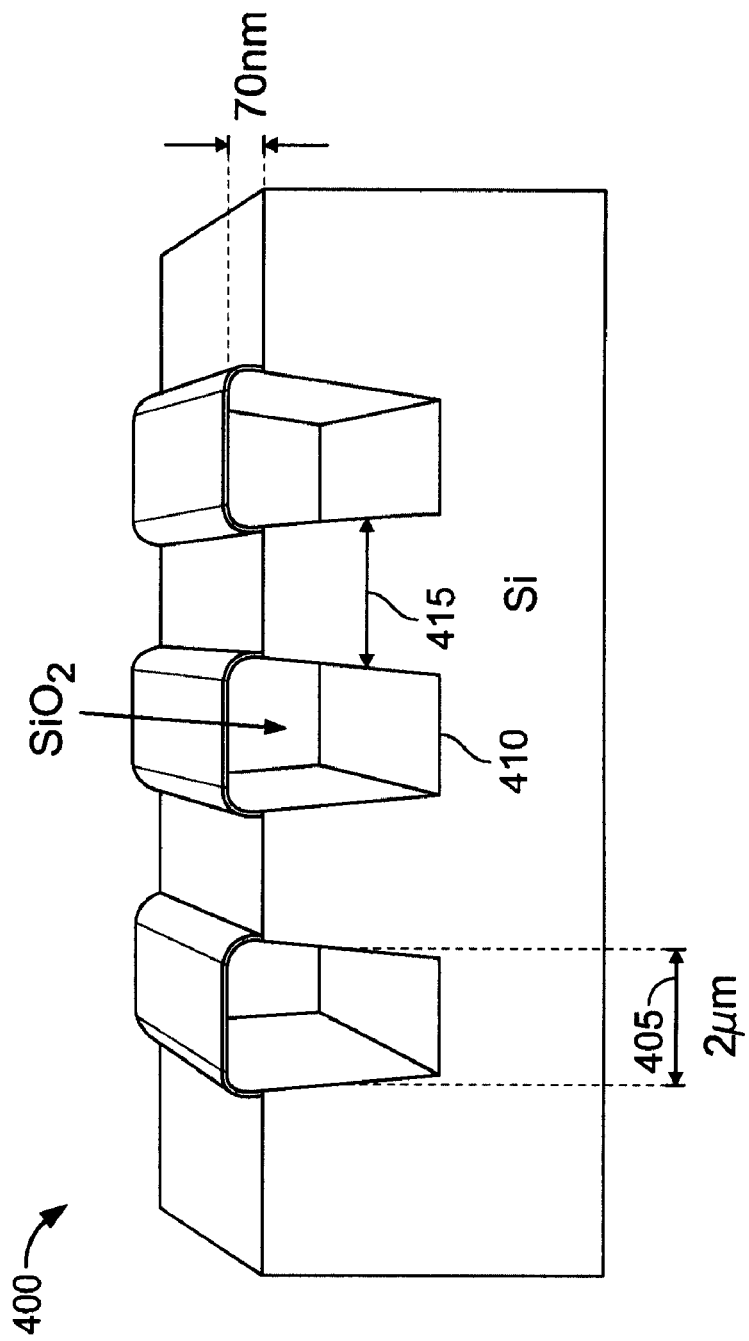
FIG. 4 shows a surface height profile of a multi-layer test object.

It is to be understood that the above technique can be extended to more complicated test objects. For example, FIG. 4 shows an example of a three dimensional profile map generated by a model-based simultaneous measurement of the top surface and buried trenches for a sample comprised of silicon dioxide ($SiO_2$) and silicon (Si). The profile data can be analyzed to provide lateral metrology data. For example, using the techniques referenced above, the surface height profile of the buried silicon layer can be identified, converted into a lateral metrology image, and analyzed using machine vision to determine lateral measurement characteristics, such as, e.g., the trench width 405, trench position 410, or trench spacing 415.

Although one purpose of PSI is to leverage the surface height information contained in interference fringes (as described above), there are occasions where these very same fringes are undesirable. For example, some lateral metrology applications rely on intensity patterns generated by conventional non-interferometric imaging systems. In these situations, it is desirable to provide a reflected intensity profile free of interference fringes.

Figure 5:
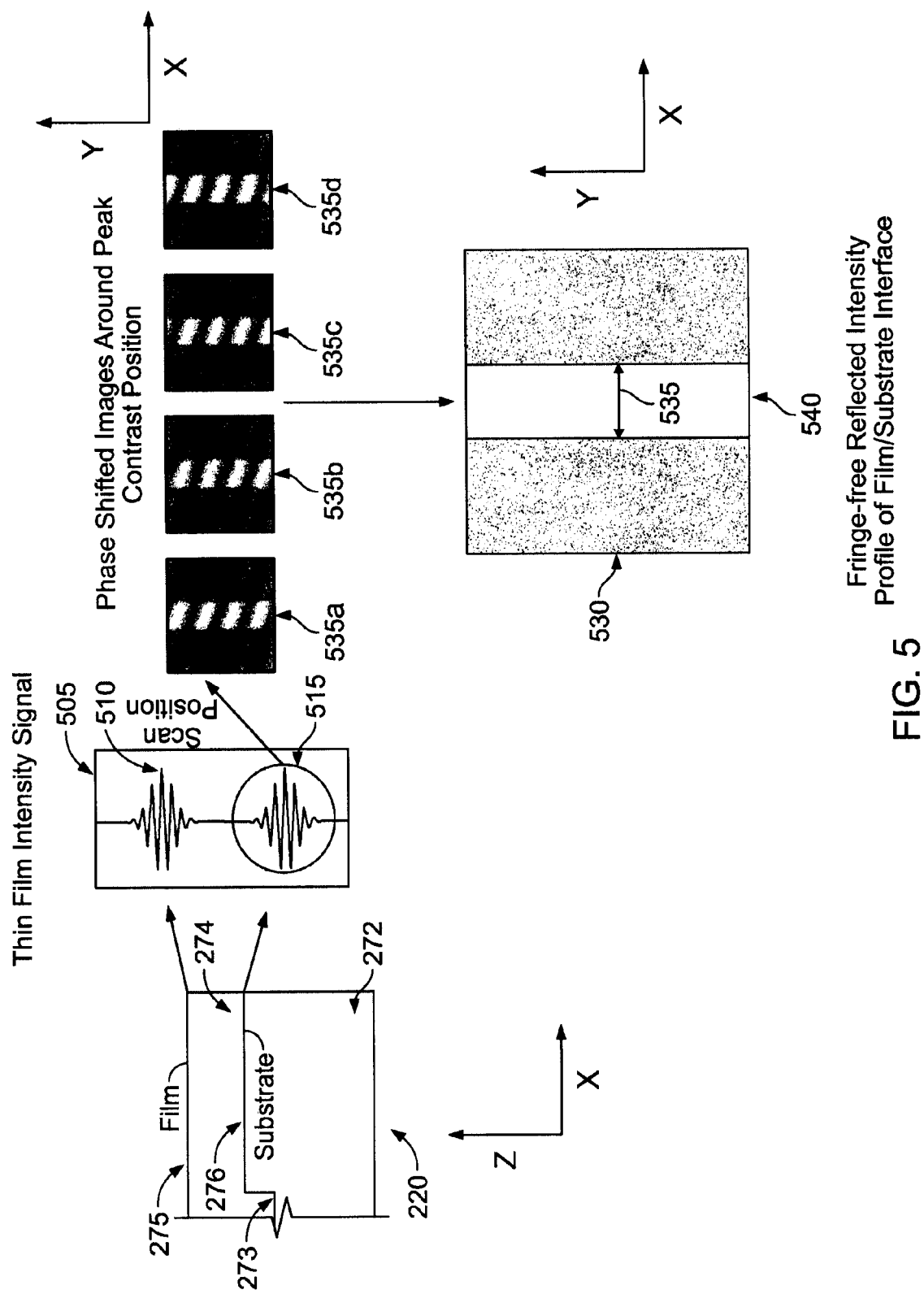
FIG. 5 illustrates a lateral metrology measurement using a reflected intensity profile.

As illustrated in FIG. 5, in one embodiment, scanning interferometry system 200 is used to perform lateral metrology of test object 220 based on a reflected intensity profile extracted from SWLI data. As described above, system 200 acquires SWLI data in the form of a series of interference pattern images acquired at multiple scan positions along the line of the surface height (z) coordinate. A typical interference intensity signal 505 acquired at a single pixel of camera 240 is shown as a function of scan position. Interference intensity signal 505 shows areas of localized fringe contrast 510 and 515 corresponding to upper and lower interfaces 275 and 276 of test object 220.

Computer 271 analyzes the interface intensity signals to identify the region of fringe contrast corresponding to lower interface 276. For example, in embodiments where film 274 is sufficiently thick that interference signal 505 exhibits two distinct regions of fringes 510 and 515 corresponding to the upper interface 275 and lower interface 276 of the film, the position of the second peak in fringe contrast 515 along the scan can be identified with the lower interface 276. As noted above, in embodiments featuring multiple films, or thin films which produce interference signals with overlapping regions of fringe contrast, other techniques may be employed to identify the interference data corresponding to the buried structure. Computer 271 processes the interference data to produce a fringe-free reflected intensity profile 530 of the buried substrate layer 272.

One technique for generating the fringe-free reflected intensity profile 530 is to average a sequence of phase shifted interference pattern images 535a, 535b, 535c, and 535d taken at scan positions around contrast peak 515 corresponding to the lower interface 276. As shown in FIG. 5, images 535a, 535b, 535c, and 535d are simulated interference images of buried surface 276 having a relatively brightly-reflecting center trench 273. The images from left to right are phase shifted in sequence by an amount nominally equal $\pi/2$. Because the scan positions are chosen so that the phase shifted images are equally spaced and span $2\pi$ in overall phase shift, averaging the sequence substantially nulls out the interference fringes to produce fringe free reflected lateral metrology image 530. Although four phase-shifted interference pattern images are shown, it is to be understood that more or fewer may be used.

In some embodiments, other fringe reduction techniques may be used, such as those described in as described in U.S. Pat. Pub. No. US 2003-0197871-A1 entitled "INTERFEROMETRY METHOD AND APPARATUS FOR PRODUCING METROLOGY IMAGES" and incorporated herein by reference. Such techniques include, for example, taking an unequally weighted average of sequences of the phase shifted images to provide a reflected intensity profile which is less susceptible to error such as, for example, print through error or phase shift calibration error.

Computer 271 analyzes fringe free reflected intensity profile 530 to determine a lateral metrology characteristic of a buried surface such as, for example, the linewidth 540 or position 545 of trench 273. As described above, many known machine vision techniques are readily adapted to the lateral metrology of the reflected intensity profile.

A combination of physical parameters, such as, for example, the numerical aperture and spectral bandwidth of the light illuminating the test object 220, determine the scan position of peak fringe contrast corresponding to buried surface 216. On the other hand, the scan position where the image of the buried surface 276 produced at camera 240 is well focused (henceforth, the position of best focus) is determined by, for example, the thickness, refractive properties (e.g. index of refraction), and position in space of thin film 274. As a result, these two positions are generally not equal. Further discussion of the parameter dependence of fringe contrast can be found in, for example, U.S. patent application Ser. No. 10/974,466, entitled "SCANNING INTERFEROMETRY FOR THIN FILM THICKNESS AND SURFACE MEASUREMENTS," and filed Oct. 27, 2004, and incorporated herein by reference.

FIGS. 6a and 6b illustrate a case where the scan position of peak contrast is not equal to the position of best focus for buried surface 276s. FIG. 6a shows the configuration of interferometry system 200 at the position of best focus for buried surface 276. The marginal rays of light reflected from point 605 on buried surface 276 which pass through lens 211 are indicated by solid lines. The marginal rays of lens 211 in the absence of material are indicated by dashed lines. Light from point 605 on buried surface 276 travels through film 274. The light is refracted at air-film interface 275 and is then well-collimated by lens 211, and subsequently focused by lens 230 (not shown) to form a well focused image at camera 240 (not shown).

FIG. 6b shows the configuration of interferometry system 200 at the scan position of peak contrast for buried surface 276. The marginal rays of light reflected from point 605 on buried surface 276 are indicated by solid lines. The marginal rays of light focused by lens 211 in the absence of material are indicated by dashed lines. Light from point 605 on buried surface 276 travels through film 274 and is refracted at air-film interface 275. Because the relative position of buried surface 276 and lens 211 is different than that in the best focus configuration, the reflected light is poorly collimated by lens 211, and subsequently directed by lens 230 (not shown) to form a poorly focused image at camera 240 (not shown). In some embodiments, this poor focus can obscure lateral features of structures (e.g., trench 273, not shown) on buried surface 276. For example, embodiments in which interferometry system 200 operates with high numerical aperture or narrow depth of field can be susceptible to error caused by poor focus.

Figure 7:
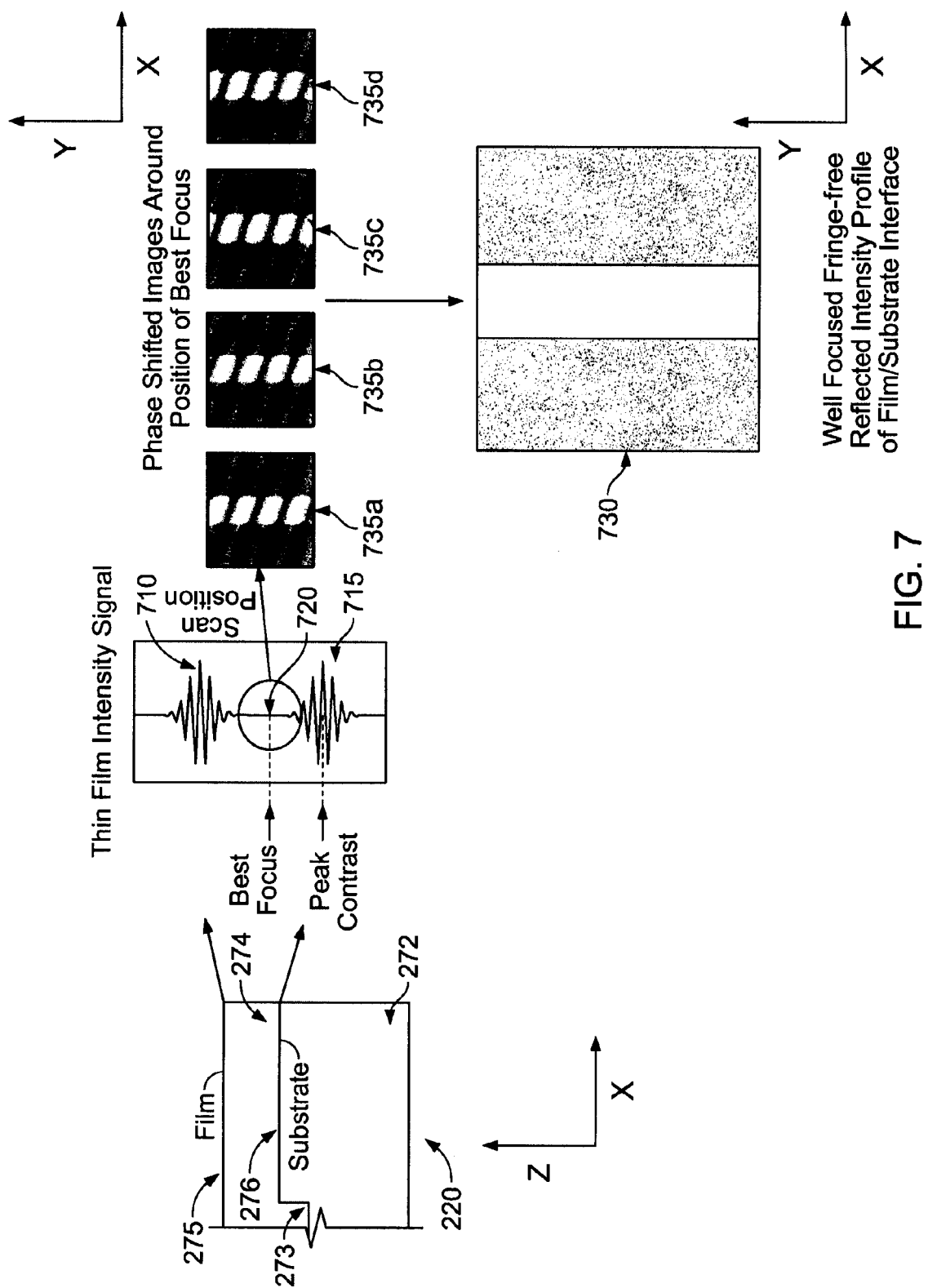
FIG. 7 illustrates a lateral metrology measurement using a well-focused reflected intensity profile.

As illustrated FIG. 7, in one embodiment scanning interferometry system 200 is used to perform lateral metrology of test object 220 based on a well focused reflected intensity profile. As described above, system 200 acquires SWLI data in the form of a series of interference pattern images acquired at multiple scan positions along the line of the surface height (z) coordinate. A typical interference intensity signal 705 acquired at a single pixel of camera 240 is shown as a function of scan position. Interference intensity signal 705 shows areas of localized fringe contrast 710 and 715 corresponding to upper and lower interfaces 275 and 276 of test object 220.

Computer 271 analyzes the interference intensity signals to identify the scan position 720 corresponding to the position of best focus for buried surface 276. For example, in some embodiments, information related to thickness, refractive properties, and/or spatial position of film 274 may be determined based on the intensity signals using, for example, techniques descried in US. Pat. Pub. No. US-2006-0262321 "METHOD AND SYSTEM FOR ANALYZING LOW-COHERENCE INTERFEROMETRY SIGNALS FOR INFORMATION ABOUT THIN FILM STRUCTURES" incorporated by reference above.

The position of best focus is determined based on this information and, alternatively or additionally, information about the optical properties of interferometer system 200. Using this information, computer 271 calculates the position of best focus using, for example, well known techniques from optics (e.g., Snell's law, etc.). Examples of this analysis are given below.

Computer 271 processes the interference data to produce a fringe free reflected intensity profile 730 of the buried substrate layer 272 at the position of best focus. For example, as described above, the fringe-free reflected intensity profile 730 may be obtained by averaging a series of phase shifted interference pattern images 735a, 735b, 735c, and 735d taken at scan positions around the scan position 720 corresponding to the position of best focus. In some embodiments, other techniques may be used, such as those described in as described in U.S. Pat. App. Pub. No. US-2003-0197871-A1 entitled "INTERFEROMETRY METHOD AND APPARATUS FOR PRODUCING METROLOGY IMAGES" and incorporated by reference above.

Computer 271 processes fringe free reflected intensity profile 730 to determine a lateral metrology characteristic of a buried surface such as, for example, the linewidth 740 or position 745 of trench 273. As described above, many known machine vision techniques are readily adapted to the lateral metrology of the reflected intensity profile.

Several techniques can be used to determine the position of best focus for buried surface 276. In general these techniques use information determined by analyzing interference intensity signals to provide estimates of spatial properties (e.g., film thickness at various lateral locations) and/or optical properties (e.g. index of refraction or group index) of test object. These properties (along with, in some cases, previously know or otherwise determined object properties) are used to determine the position of best focus.

For example, in various embodiments, interferometer intensity signals are analyzed to determine a position of peak fringe contrast corresponding to a buried surface. As discussed above, due to the optical effects of the film covering the buried surface, this position is not, in general, equal to the position of best focus for the buried surface. A correction factor is calculated using the information about the test object.

For example, in the techniques described below, estimates of spatial and optical properties are used to determine information related to the difference between the physical thickness and the optical thickness of film 274 (which covers buried surface 276. The optical thickness L' of a layer of material is generally given by the relation $$L'=n'L, \qquad \text{Eq. (2)}$$

where n' is the refractive index of film 274 and L is the physical thickness of film 274. However, as described in U.S. patent application Ser. No. 10/974,466, entitled "SCANNING INTERFEROMETRY FOR THIN FILM THICKNESS AND SURFACE MEASUREMENTS," incorporated by reference above, the interference signal generation for a thin film is quite interesting and has some surprises, especially with high-NA objectives. For example, FIGS. 11(a) and 11(b) compare computer simulations of a model of an interference microscope for an L=2-μm layer of a hypothetical dielectric film of index n'=2 on a substrate of index 4. FIG. 6(a) shows that with the white light illumination, there are two distinct signals corresponding to the two interfaces. The film appears to be twice the physical thickness L, the optical thickness being close to Ln'. The signals are well separated and one can analyze each of them separately to determine the profile of each interface. According to Eq. 2, a technique for finding the physical thickness is to divide by the index of refraction n'. The model shows, however, that the correction is more accurately the group velocity index $n_G$ of the film material, which takes into account the dispersion in the material. Note that the group velocity index is defined as the derivative of the wavenumber with respect to frequency. The distinction can be very important. For example, if the film is common silicon dioxide, using the group velocity index as improves the measurement accuracy with respect to the prior art by 4%.

FIG. 6(b) shows that for monochromatic light and a high-NA objective, there are again two signals, but this time they are much closer together than in FIG. 6(a), the optical thickness being close to L/n'. Here the apparent thickness is actually inferior to the physical thickness by about a factor of two. Use of Eq. 2 in this case would lead to an even more serious error in determining the correct physical thickness. The situation is farther complicated when using a high NA objective and broadband light. In such cases the two effects described above compete, with dispersion tending to increase the optical thickness relative to the physical thickness, while defocusing due to high NA tending to decrease the optical thickness relative to the physical thickness. In some embodiments, the competition of these effects may be simplified by decreasing the size of aperture 204, so as to reduce the contribution of the high NA effect on the optical thickness. This causes dispersion effects to dominate such that $Ln_G$ remains a good estimate of the optical thickness.

In the following discussion, it is assumed for simplicity that this estimate is appropriate, and such that $n_G$ is the effective index of refraction of film 274. For example, still referring to FIG. 7, let T equal the scan position of peak contrast within the area of localized fringe contrast 710 corresponding to air-film interface 275. Because this interface 275 is not a buried interface, T will depend only on the physical location of the interface. Let C equal the scan position at the area of peak fringe contrast 715 corresponding to buried surface 276. This location depends on the actual location l of buried surface 276 within the scan, on the thickness of film 274, which is equal to t=T−l and on the effective refractive index (i.e. the group index) $n_g$ of film 274. Correcting for the optical thickness $n_g t$ of layer 274, we obtain:

$$C=T-n_g t, \qquad \text{Eq. (3)}$$

where we have chosen the z-axis such that T>l. The location of best focus F for the buried surface 276 is then:

$$F=T-t/n_g. \qquad \text{Eq. (4)}$$

It follows that the location of best focus for buried layer 276 can be calculated from the measured locations T and C using:

$$F=T-(T-C)/n_g^2. \quad \text{Eq. (5)}$$

In this case, to determine F, an estimate of the effective refractive index (in this case, group index $n_g$) of the material has to be provided or determined through some means. This effective index, may be known, or can be calculated using, for example, the methods described in, for example, X. Coloona de Lega and P. de Groot "Optical Topography Measurement of Patterned Wafers" in CHARACTERIZATION AND METROLOGY FOR ULSI TECHNOLOGY 2005. AIP Conference Proceedings, Volume 788, pp. 432-436 (2005).

Figure 8:
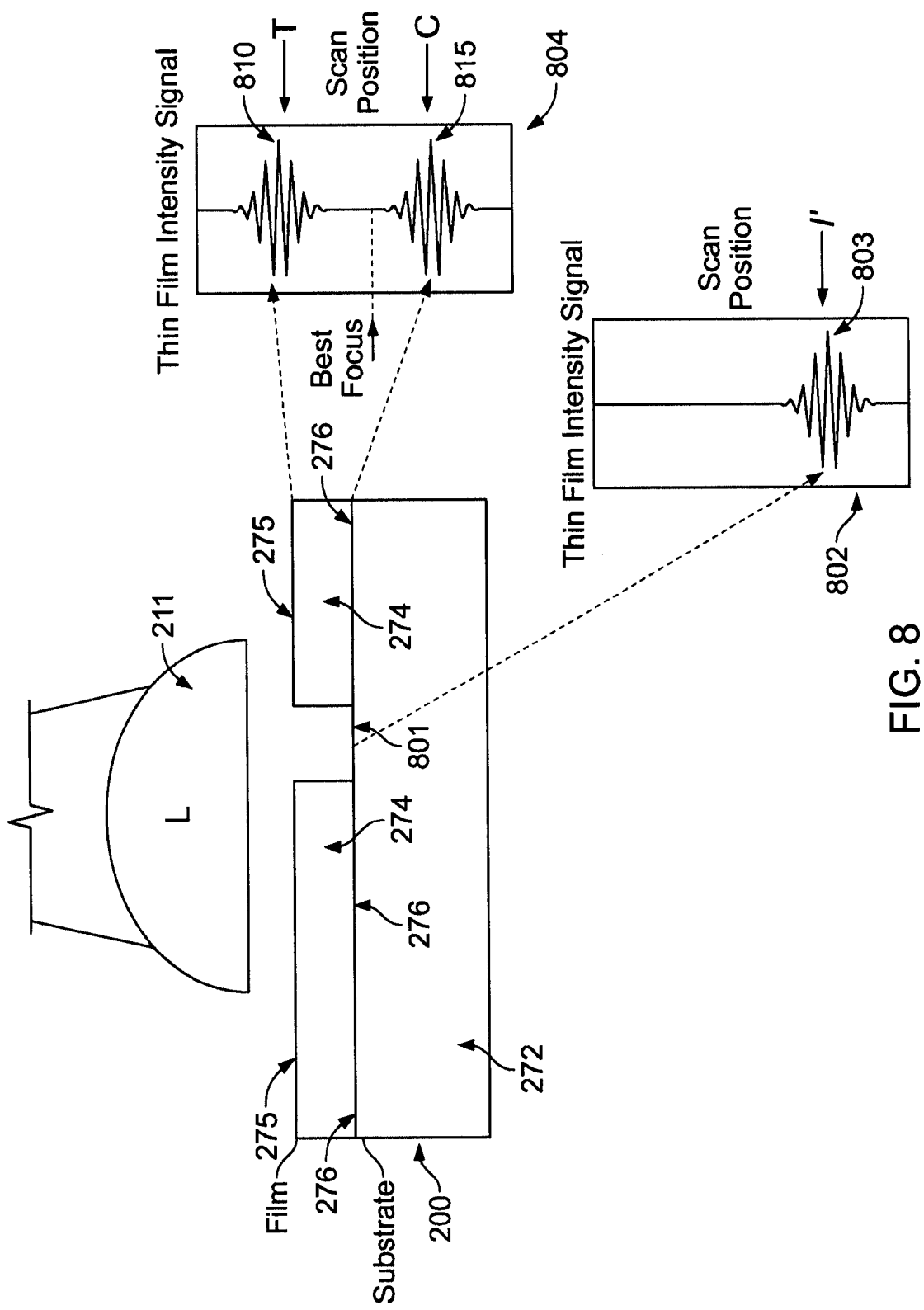
FIG. 8 illustrates a lateral metrology measurement using a well-focused reflected intensity profile of a test object with a partially exposed buried surface.

Referring to FIG. 8, in another example, a portion of film 274 is removed (e.g. by etching) to expose an area 801 of buried surface 276 to the ambient medium (e.g., air). Examples of such a configuration are the vias or contact holes familiar from integrated circuit (IC) manufacturing. In this configuration the physical film thickness can be measured directly as the step from the top of the film to the material exposed at the bottom of the etched area 801. Consider interference signal 802, corresponding to a location on test object 220 in exposed area 801. Let I' equal the scan position corresponding to contrast peak 803. Because buried interface 276 is exposed at this location, position I' will correspond to the bottom of etched area 801. Next consider interference signal 804 corresponding to a location on test object 220 not in exposed area 801. As above, let T equal the scan position of the peak contrast position of the area of fringe contrast 810 corresponding to air-film interface 275. Because interface 275 is not a buried interface, T will depend only on the physical location of the interface. Let C equal the scan position of the position where the area of fringe contrast 815 corresponding to buried surface 276. The film thickness is then given as:

$$t=T-I'. \quad \text{Eq. (6)}$$

Assuming the film thickness is uniform in the area of interest, the depth of the exposed area will be equal to T, and so the effective index of refraction can be found by taking the ratio $$n_g = \frac{T-C}{T-I'} \quad (7)$$

The best-focus location follows from Eqs. 4 and 7 as $$F = T - \frac{(T-I')^2}{T-C}, \quad (8)$$

which does not depend on $n_g$. Thus no further measurement of the effective index of retraction is required.

Note that, if buried surface 276 and/or film surface 275 vary significantly in height over the lateral (x,y) dimension, or if film 274 varies significantly in optical properties (e.g. effective index of refraction) over the lateral (x,y) dimension, the position of best focus will also vary over the lateral dimension. This might be the case if, for example, surface feature 273 of object 220 is significantly deep (i.e. deeper than the depth of field of interferometer system 200). In such instances, portions of the generated reflected intensity profile will not be well focused. To avoid this, test object 220 can be divided up into regions where the thickness and/or optical properties (and hence position of best focus of buried surface 276) are relatively uniform across the lateral dimension. For example, test object 200 could be divided into a region corresponding to exposed area 801, a region corresponding to buried surface feature 273 (not shown), and one or more regions corresponding to the remainder of buried film 276. The above described techniques can be applied separately to each region to produce multiple, well-focused fringe free reflected intensity profiles (this is essentially equivalent to treating each region as a separate buried surface). In some embodiments, these multiple profiles can be analyzed individually to provide lateral metrology information about the corresponding region of test object 220. In some embodiments, some or all of the multiple intensity profiles can also be combined to form a larger composite well-focused fringe free reflected intensity profiles which can be analyzed as a whole to determine lateral metrology information about test object 220 over a region corresponding to the multiple combined profiles.

In some embodiments, interferometry system 200 operates in multiple modes applying one or more of the procedures described above. For example, in some embodiments the system can operate in a first mode to perform lateral metrology based on a surface height profile, and in a second mode to perform lateral metrology based on a fringe-free reflected intensity profile. In some embodiments information obtained in a first mode can be used to aid, improve, calibrate and/or verify the operation of the system in a second mode.

Additionally, the interference signals produced by interferometry system 200 can be analyzed directly to measure spatial and/or material properties of measurement object 220 to determine information about object 220 which can be used to aid, improve, calibrate and/or verify the lateral metrology measurements made using the techniques described above.

Although test object 220 described above includes a single film and a single buried feature (i.e., trench 273), the procedures described above can be applied to provide lateral metrology of more complicated objects featuring, for example, multiple layers or films and multiple buried features of various shapes and sizes.

Figure 9A:
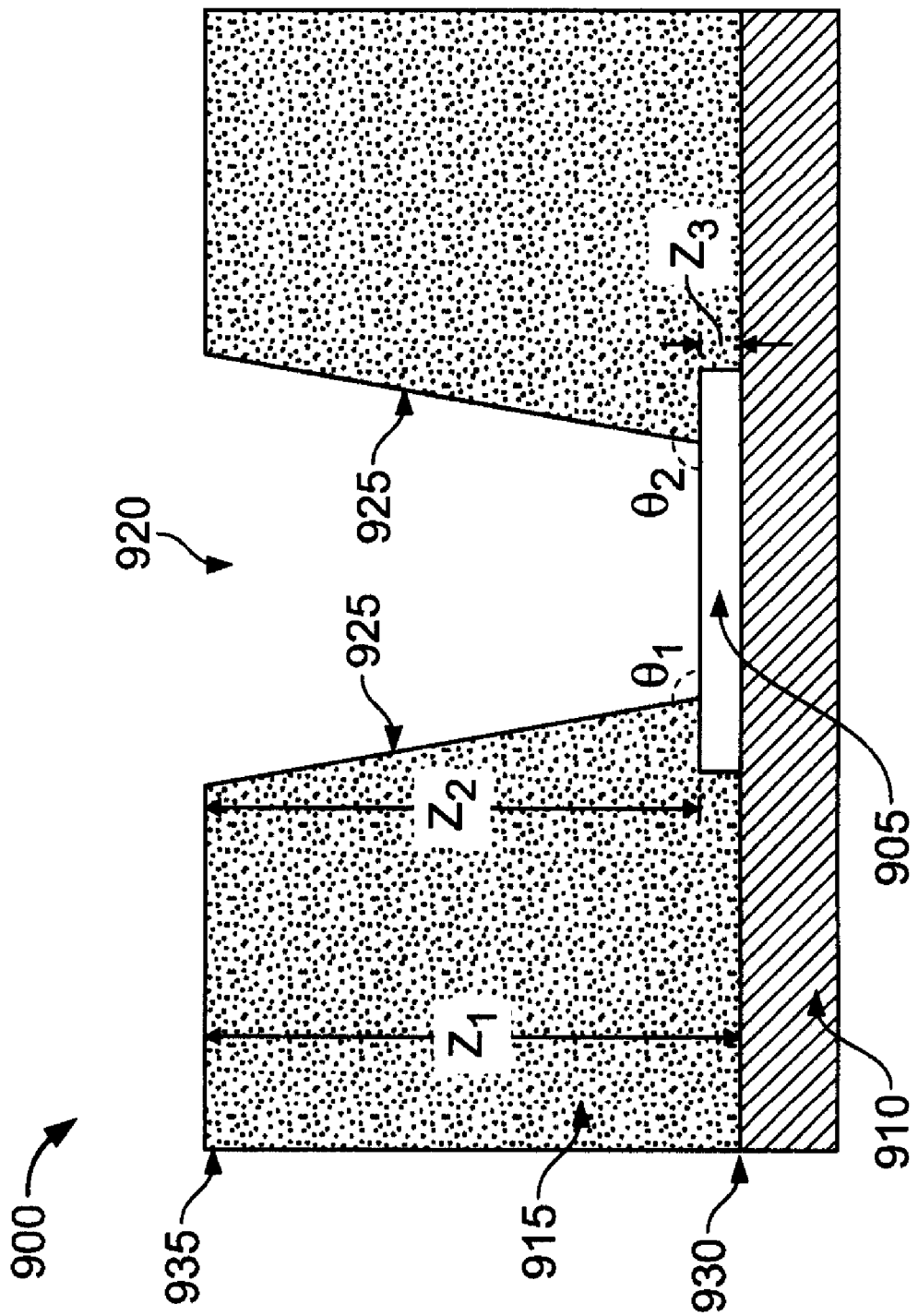
FIG. 9a shows a cross section of test object 900.
Figure 9B:
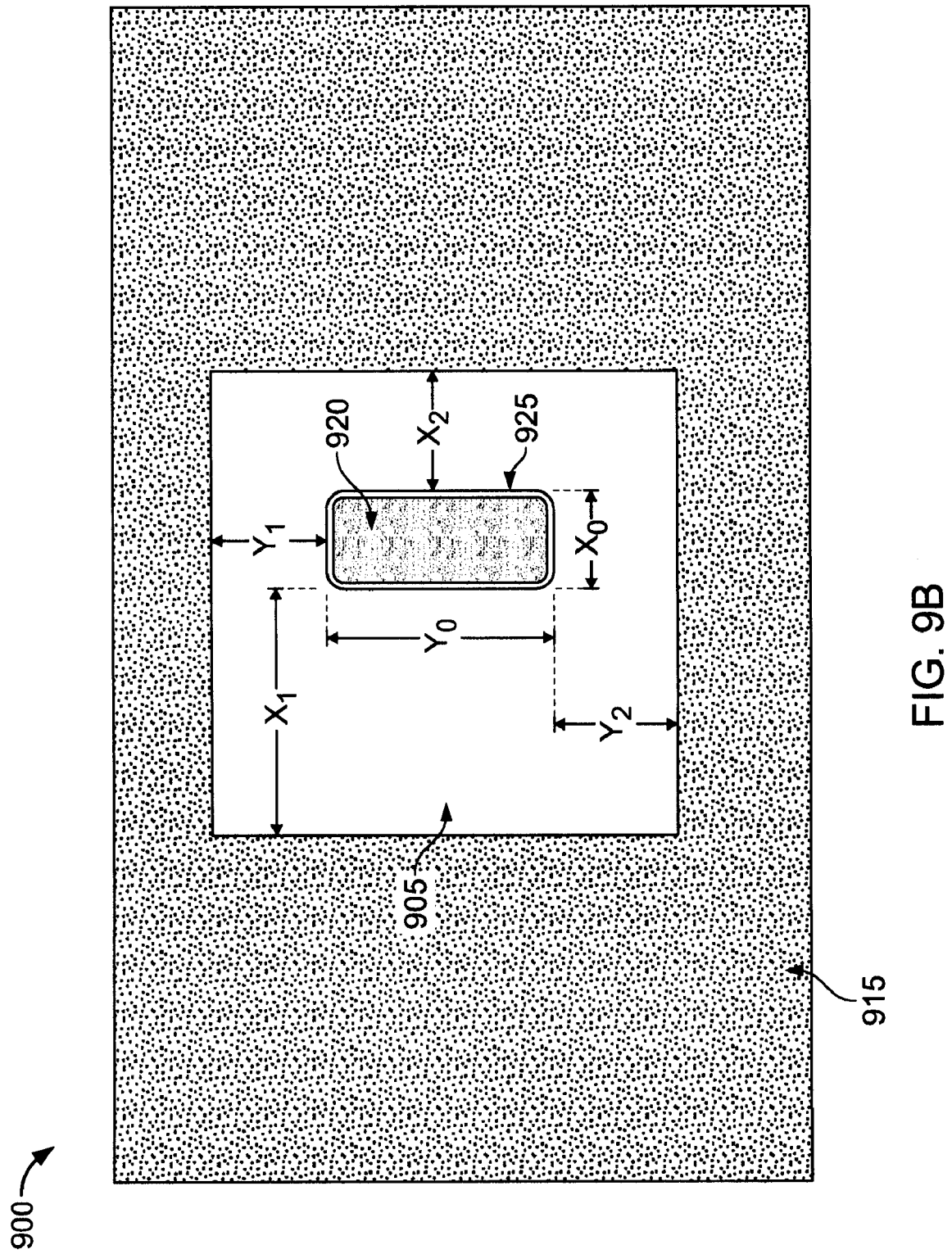
FIG. 9b shows a top-down view of test object 900.

For example, FIGS. 9a and 9b show, respectively, a schematic cross-section and a top-down view of test object 900 which is of a type often encountered encounter in semiconductor processing. Referring to FIGS. 9a and 9b, measurement object 900 includes pad 905 (e.g., a metal contact pad) deposited on substrate 910. Covering layer 915 (e.g. a polymide layer) has been deposited over substrate 910 and pad 905, and then etched to produce via hole 920 through covering layer 915 to pad 905. Via hole 920 has a tapered sidewall 925.

Structures of the type of object 900 are often used in IC production applications to provide electrical contact between separated layers in semiconductor wafer. For example, if via hole 920 were filled with a conducting material, and an additional layer were deposited on top of covering layer 915, electrical contact would be made between pad 905 and the new layer. However, such contact structures are typically sensitive to errors such as misalignment of via hole 920 with pad 905. As such, several properties of measurement object 900 are of interest.

Referring to FIG. 9a, examples include the thickness $z_1$ of covering layer 915 from bottom interface 930 to top surface 935, thickness $z_2$ of covering layer 915 from bottom interface 930 to top surface 935, and thickness $z_3$ of pad 905 from bottom interface 930 to the top of pad 905. Also of interest of sidewall angles $\theta_1$ and $\theta_2$. Referring to FIG. 9b, additional quantities of interest are the length $x_0$ and width $y_0$ of via hole 920, and the registration of via hole 920 relative to pad 905 as indicated by registration coordinates ($x_1$, $y_1$, $x_2$, $y_2$). Also of interest is the thickness of sidewall 925.

Note that object 900 has regions of where thickness, film structure and optical properties vary over the lateral dimensions (e.g. the region of via hole 920, or the region of pad 905). As discussed above, in some embodiments, the test object can be divided up into multiple regions which are uniform across the lateral dimensions. Positions of best focus for the buried surface of interest are then found for each region, and multiple fringe free intensity profiles are produced for each region. These profiles can then be analyzed individually, or combined and analyzed as a composite. In the following, for simplicity, it will be assumed that these lateral variations are not of significance, and therefore a single fringe-free intensity profile at the position of best focus for buried surface will provide in-focus information across the entirety of object 900.

Figure 10:
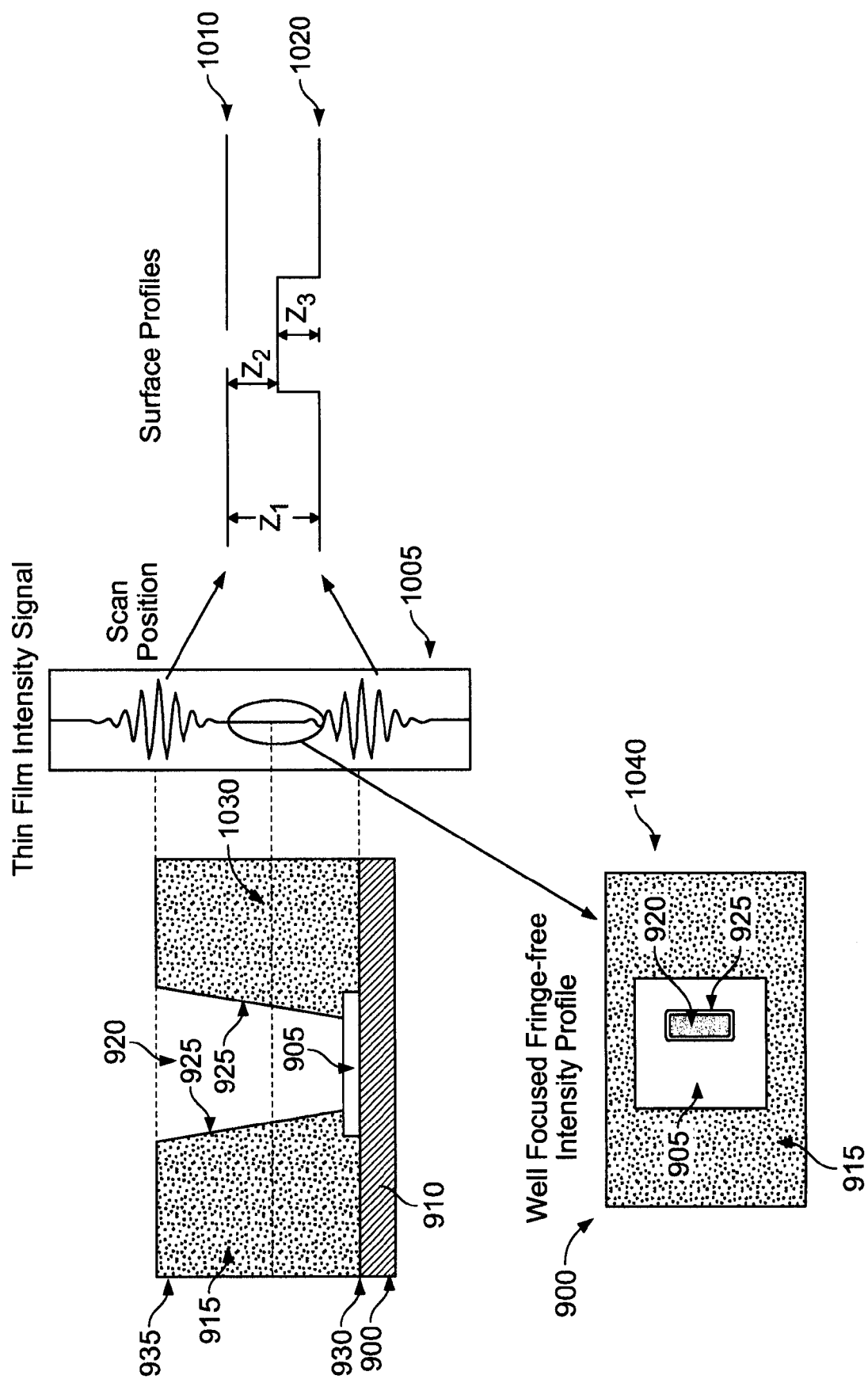
FIG. 10 illustrates metrology of test object 900.

Referring to FIG. 10, interferometry system 200 (not shown) operates to provide scanning interferometry intensity signals (e.g., signal 1005). The signals are analyzed to localized areas of fringe contrast corresponding to top surface 935 and buried interface 930, and to provide surface profiles 1010 and 1020 of the respective surfaces. The signals are also analyzed to determine the scan position corresponding to position of best focus 1030, and to produce fringe free intensity profile 1040 at this position.

Surface profiles 1010 and 1020 are analyzed to determine thicknesses $z_1$, $z_2$, and $z_3$. Fringe-free intensity profile 1040 is analyzed using machine vision techniques to determine lateral metrology information. By identifying features such as the edges of pad 905 and via hole 920, the machine vision can determine information such as the size ($x_0$, $y_0$) of via hole 920 and registration ($x_1$, $y_1$, $x_2$, $y_2$) of the via hole with buried pad 905, and the lateral thickness and/or angles ($\theta_1$, $\theta_2$) of sidewall 925. In some embodiments, one or more measured parameters can be used to confirm or improve another measurement. For example knowledge of the lateral thickness of sidewall 925 along with film thickness $z_2$ provides an estimate of the sidewall angle of vial hole 920 which can be used to confirm sidewall angles (e.g., $\theta_1$, $\theta_2$) determined directly from the fringe-free intensity profile.

In some embodiments, scanning interferometry intensity signals may be used to determine further information comprising, for example, the material properties (e.g. index of refraction) of covering film 915 or pad 905. This information can be used to improve or refine other measurements. For example, as described above, knowledge of the index of refraction of covering film 915 can be used in determining the position of best focus for obtaining a fringe free intensity profile.

The above described techniques can be used to monitor and/or control IC fabrication process. For example, an object can be measured at an intermediate stage of a fabrication process. If one or more of the measured quantities is outside some predetermined tolerance, such that the object would likely fail to operate correctly at the end of the process, the object can be discarded as defective. This avoids wasteful spending on further processing object that is not likely to yield a working device. The measured information can also be fed back to modify the fabrication process so as to bring it back within acceptable tolerances. For example, for measurement object 900, if the registration of via hole 920 and pad 905 becomes misaligned, the object can be discarded, and the etch process used to form via hole 905 modified to re-align the etch for subsequently processed objects. In some embodiments, the above described monitoring and/or control techniques can be accomplished by outputting information about a measurement object to an automated unit that controls one or more IC fabrication or measurement tools. For example, in some embodiments system 200 can be coupled to a fabrication tool such as a photolithography tool, an etching tool, etc. to automatically adjust the alignment of the tool based on information about the alignment or position of features on a measurement object. In some embodiments system 200 can be coupled to an automatic defect detection or review tool to automatically supply the tool with information about an object which aids, supplements, or confirms the tool's detection and/or review processes.

The procedures described above can be applied to a large range of low coherence interferometry systems. For example, the light source in the interferometer may be any of: an incandescent source, such as a halogen bulb or metal halide lamp, with or without spectral bandpass filters; a broadband laser diode; a light-emitting diode; a combination of several light sources of the same or different types; an arc lamp; any source in the visible spectral region; any source in the IR spectral region, particularly for viewing rough surfaces & applying phase profiling; any source in the UV spectral region, particularly for enhanced lateral resolution; and any source or combination of sources having a net spectral bandwidth broader than 0.1% of the mean wavelength.

In some embodiments light source is a spatially coherent light source. For example, in some embodiments, the source includes a so called "monomode" fiber which supports only a single (or, in some cases, a few) spatial mode for light propagating along the fiber. See, e.g., *Encyclopedia of Laser Physics and Technology*, available at http://www.rp-photonics.com/single_mode_fibers.html. In some embodiments, the source includes an optical fiber which includes a photonic bandgap material (e.g. photonic crystal material) or other nonlinear material which is capable of supporting spatially coherent light over a very broad range of wavelengths (e.g. up to hundreds of nanometers or more), thereby allowing for very broadband spatially coherent illumination. See, e.g. *Encyclopedia of Laser Physics and Technology*, available at http://www.rp-photonics.com/photonic_crystal_fibers.html. Such a fiber may also be a monomode fiber, supporting a single (or few) spatial mode for light over a very wide range of wavelengths (e.g. a range spanning wavelengths from the infra-red and above to the ultraviolet and below). See, e.g. *Encyclopedia of Laser Physics and Technology*, available at http://www.rp-photonics.com/supercontinuum_generation-.html. In some embodiments, the light source includes a fiber which contains nonlinear material which acts to further broaden the spectral range of light input into the fiber. Nonlinear effects (e.g. Raman scattering or four wave mixing) occur as the light propagates along the fiber, producing light at wavelengths other than those present in the input light. In some such embodiments, the source may include a relatively narrowband source, with spectral broadening provided by the fiber to produce broadband output light 104.

In further embodiments, the source may include a resonant cavity capable of producing a spatially coherent output beam. Such a source may, for example, include a resonant cavity pumped by a source (e.g. a laser, light emitting diode (LED), or LED array) to excite the cavity to resonate at a single (or a few) spatial mode of the cavity. The output of the cavity will thereby be spatially coherent. In some embodiments the cavity may include a filter which acts to limit the number of spatial modes which are supported by the resonant cavity. Furthermore, the scanning system may be: driven by any of a piezo-electric device, a stepper motor, and a voice coil; implemented opto-mechanically or opto-electronically rather than by pure translation (e.g., by using any of liquid crystals, electro-optic effects, strained fibers, and rotating waveplates); any of a driver with a flexure mount and any driver with a mechanical stage, e.g. roller bearings or air bearings. In additional interferometer embodiments, the phase-shifts may be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

The interferometer optics may form any of: an interferometric microscope employing, e.g., a Mirau or Michelson objective lens; a Linnik, a Twyman Green system; a Fizeau interferometer employing a filtered or structured source spectrum so as to provide coherence peaks far from zero OPD; a fiber interferometer; and a Mach Zehnder, particularly for profiling transparent media.

In some embodiments the interferometer can be configured such that some or all of the interferometer's optical elements are reflective elements. For example, in applications where input light is in the UV or extreme UV (EUV) spectral, refractive optical elements using typical materials would absorb a substantial amount of the light. In such applications all refractive elements in the interferometer could be replaced by reflective elements such as, for example, curved mirrors.

The various translations stages in the system may be: driven by any of a piezo-electric device, a stepper motor, and a voice coil; implemented opto-mechanically or opto-electronically rather than by pure translation (e.g., by using any of liquid crystals, electro-optic effects, strained fibers, and rotating waveplates) to introduce an optical path length variation; any of a driver with a flexure mount and any driver with a mechanical stage, e.g. roller bearings or air bearings. The data analysis may involve any of: frequency domain analysis (FDA); peak-fringe analysis; dynamic filtering to extract the fringe visibility in real time; a least-squares technique to extract fringe visibility and phase at the same time; and fringe visibility analysis followed by phase analysis, potentially comprising a separate measurement for phase with a modified source spectrum; pattern matching or model-based analysis, comprising analysis of under-resolved features.

In the embodiments described above, computer 271 processes of the phase-shifting interferometry data. More generally, the processing can be performed in an electronic controller that includes hardware, software, or a combination of both to control the other components of the system and process the phase-shifted images to extract the desired information about the measurement object. The processing steps described above can be implemented in computer programs using standard programming techniques. Such programs are designed to execute on programmable computers which include a processor, a data storage system (comprising memory and/or storage elements), at least one input device, and least one output device, such as a display or printer. The program code is applied to input data (e.g., the phase-shifted images from the CCD camera) to perform the functions described herein and generate output information (e.g., a lateral metrology images comprising surface profiles and or reflected intensity profiles, lateral metrology information, etc.) which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

In various embodiments, interferometer system 200 outputs metrology data to, for example, a user display, a printer, a machine-readable medium or storage device, a electronic controller, etc. In some embodiments, the output data can automatically control a further device or devices (e.g., IC processing and/or metrology tools).

Other aspects, advantages, and modifications are within the scope of the following claims.

What is claimed is:

1. A method comprising:
   using a scanning interferometry system comprising a reference surface to generate a sequence of phase-shifted interferometry images at different scan positions of an object comprising a buried surface, each scan position corresponding to a different optical path length difference between light collected from the object and light collected from a reference surface;
   identifying a scan position corresponding to the position of best focus for the buried surface based on the sequence of phase-shifted interferometry images of the object; and
   generating a final image based on the phase-shifted interferometry images and the scan position corresponding to the position of best focus,
   wherein a contrast of intensity fringes in the final image is reduced relative to a contrast of intensity fringes in the phase-shifted interferometry images and the position of best focus for the buried surface is different from a position where the optical path length difference is zero.

2. The method of claim 1, wherein generating the sequence of phase-shifted interferometry images comprises varying the optical path length between light collected from the object and light collected from the reference surface.

3. The method of claim 2, wherein varying the optical path length comprises translating the object relative to the reference surface.

4. The method of claim 3, wherein generating the final image comprises:
   selecting a plurality of phase shifted interferometry images from the sequence of phase-shifted images interferometry; and
   calculating an average of the selected phase-shifted interferometry images to produce a final image.

5. The method of claim 4, wherein the selecting a plurality of phase-shifted interferometry images comprises selecting images at scan positions near the scan position corresponding to the position of best focus for the buried surface.

6. The method of claim 5, further comprising: determining lateral metrology information about the buried surface based on the final image.

7. The method of claim 6, wherein the lateral metrology information comprises at least one of: the lateral position of one or more surface features, the lateral size of one or more surface features, lateral spacing of two or more surface features.

8. The method of claim 7, wherein the determining lateral metrology information about the buried surface based on the final image comprises using machine vision.

9. The method of claim 8 further comprising determining additional information about the object based on the phase-shifted interferometry images.

10. The method of claim 9, further comprising determining information about the object based on the lateral metrology information and the additional information about the object.

11. The method of claim 10, wherein the additional information about the object comprises at least one of spatial information about the object and material property information about the object.

12. The method of claim 11, wherein the object comprises a thin film, and the additional information about the object comprises at least one of a thin film thickness, a thin film position, and an optical property of the film.

13. The method of claim 6, wherein the object comprises a second surface, and wherein the lateral metrology information comprises a position of a surface feature of the second surface relative to a position of a surface feature of the buried surface.

14. The method of claim 3, wherein the interferometry system is a low-coherence scanning interferometry system.

15. The method of claim 3, wherein generating the final image comprises averaging at least some of the phase-shifted interferometry images so that the final image is a fringe-free intensity image.

16. The method of claim 14, wherein generating the sequence of phase-shifted interferometry images at different scan positions of an object comprising a buried surface comprises:
for each location on the object, generating an intensity signal for the different scan positions.

17. The method of claim 16, wherein identifying a scan position corresponding to the position of best focus for the buried surface comprises identifying the position of best focus based on a fringe contrast of the intensity signals.

18. The method of claim 17, further comprising:
determining a scan position of localized fringe contrast corresponding to the buried surface for one or more of the intensity signals; and
determining the scan position of best focus based on the scan position of localized fringe contrast.

19. The method of claim 18, wherein identifying the scan position of localized fringe contrast corresponding to the buried surface comprises fitting a model function to at least one intensity signal.

20. The method of claim 19, wherein the fitting a model function to the at least one intensity signal comprises a least squares fitting.

21. The method of claim 18, further comprising correcting the scan position of localized fringe contrast based on information about the object to determine the scan position of best focus.

22. The method of claim 21, wherein of the information about the object comprises at least one of a film thickness, a film refractive property, and a film position.

23. The method of claim 22, wherein the object comprises a buried surface covered by a film with a top surface exposed to the ambient environment, and further comprising:
identifying, based on fringe contrast, a scan position T corresponding to the top surface;
identifying, based on fringe contrast, a scan position C corresponding to the buried surface;
and determining the scan position of best focus F based on the relation $$F = T - (T-C)/n_g^2$$

where $n_g$ is the group index of refraction of the film.

24. The method of claim 21, wherein the object comprises a buried surface partially covered by a film with a top surface exposed to the ambient environment, such that a region of the buried surface is exposed to the ambient environment, further comprising:

identifying, based on fringe contrast, a scan position T corresponding to the top surface of the film;
identifying, based on fringe contrast, a scan position C corresponding to the top surface;
identifying, based on fringe contrast, a scan position I' corresponding to the exposed region of the buried surface;
and determining the scan position of best focus F based on the relation $$F = T - \frac{(T-I')^2}{T-C}.$$

25. A method comprising:
generating, relative to a reference surface, a sequence of phase-shifted interferometry images of an object comprising a buried surface using an interference microscope, each phase-shifted interferometry image being generated for a different scan position corresponding to a different optical path length difference between light collected from the object and light collected from a reference surface; and
generating a final image of the buried surface based on the phase-shifted interferometry images,
wherein a contrast of intensity fringes in the final image is reduced relative to a contrast of intensity fringes in the phase-shifted interferometry images and a position of best focus of the buried surface with respect to the interference microscope is different from a position where the optical path length difference is zero.

26. The method of claim 25, wherein the reference surface is a surface of the interference microscope, and generating the sequence of phase-shifted interferometry images comprises varying the optical path length between light collected from the object and light collected from reference surface.

27. The method of claim 26, further comprising determining lateral metrology information about the buried surface based on the final image.

28. The method of claim 27, wherein the determining lateral metrology information about the buried surface based on the final image comprises using machine vision.

29. The method of claim 28, further comprising determining additional information about the object based on the phase-shifted interferometry images.

30. The method of claim 29, further comprising determining further information about the object based on the lateral metrology information and the additional information about the object.

31. The method of claim 27, wherein the interference microscope is a low coherence interference microscope, and generating the final image comprises:
identifying a scan position corresponding to the buried surface;
selecting a plurality of phase-shifted interferometry images from the sequence based on the scan position corresponding to the position of best focus; and
generating the final image based on the selected phase-shifted interferometry images.

32. A non-transitory computer readable medium which causes a processor to:
generate a final image, at a position of best focus of a buried surface in an object with respect to an interference microscope, based on a sequence of phase-shifted interferometry images of the object acquired using the interference microscope comprising a reference surface, each phase-shifted interferometry image being acquired for a different scan position corresponding to a different optical path length difference between light collected from the object and light collected from a reference surface, wherein a contrast of intensity fringes in the final image is reduced relative to a contrast of intensity fringes in the phase-shifted interferometry images and the position of best focus for the buried surface is different from a position where the optical path length difference is zero; and output information based on the image.

33. An apparatus comprising:

a scanning interferometer comprising a reference surface which, during operation generates a sequence of phase-shifted interferometry images at different scan positions of an object comprising a buried surface, each scan position corresponding to a different optical path length difference between light collected from the object and light collected from a reference surface; and an electronic controller coupled to the interferometer which, during operation:

identifies a scan position corresponding to the position of best focus for the buried surface based on the sequence of phase-shifted interferometry images of the object;

generates a final image based on the phase-shifted interferometry images and the scan position corresponding to the position of best focus, wherein a contrast of intensity fringes in the final image is reduced relative to a contrast of intensity fringes in the phase-shifted interferometry images and the position of best focus for the buried surface is different from a position where the optical path length difference is zero; and outputs information based on the image.

34. The apparatus of claim 33, wherein, during operation, the electronic controller selects a plurality of phase shifted interferometry images from the sequence of phase-shifted images interferometry, the selected images comprising images at scan positions near the scan position corresponding to the position of best focus for the buried surface; and calculates an average of the selected phase-shifted interferometry images to produce a final image.

35. The apparatus of claim 34, wherein the scanning interferometer comprises a broadband source having a coherence length, which, during operation, interferes an object wavefront reflected from the object with a reference wavefront reflected from the reference surface and varies an optical path length difference between the wavefronts over a range larger than the coherence length of the source.

* * * * *